US008805579B2

(12) United States Patent
Skrinde

(10) Patent No.: US 8,805,579 B2
(45) Date of Patent: Aug. 12, 2014

(54) SUBMERSIBLE ROBOTICALLY OPERABLE VEHICLE SYSTEM FOR INFRASTRUCTURE MAINTENANCE AND INSPECTION

(76) Inventor: Richard Arthur Skrinde, Ft. Lauderdale, FL (US)

( * ) Notice: Subject to any disclaimer, the term of this patent is extended or adjusted under 35 U.S.C. 154(b) by 686 days.

(21) Appl. No.: 12/932,171

(22) Filed: Feb. 19, 2011

(65) Prior Publication Data

US 2012/0215348 A1 Aug. 23, 2012

(51) Int. Cl.
*B25J 9/00* (2006.01)

(52) U.S. Cl.
USPC ............................................. 700/245; 134/18

(58) Field of Classification Search
USPC .......... 700/245, 246, 250, 253; 901/1, 40, 50, 901/30, 41; 318/568.11, 591, 590, 576, 17, 318/568.1, 568.17, 568.19, 568.23; 15/246; 134/18, 56 R, 57 R; 483/8, 10
See application file for complete search history.

(56) References Cited

U.S. PATENT DOCUMENTS

| | | | |
|---|---|---|---|
| 2,201,680 A | 5/1940 | Haynes | |
| 3,155,319 A | 11/1964 | Hammelmann | |
| 3,740,785 A | 6/1973 | Latall | |
| 4,027,349 A | 6/1977 | Clavin | |
| 4,763,376 A | 8/1988 | Spurlock, Jr. et al. | |
| 5,069,722 A | 12/1991 | Murphy | |
| 5,146,644 A | 9/1992 | Crocco | |
| 5,431,122 A | 7/1995 | Templet, Jr. | |
| 5,444,887 A | 8/1995 | Rufolo | |
| 5,548,516 A | 8/1996 | Gudat et al. | |
| 6,108,597 A | 8/2000 | Kirchner et al. | |
| 6,162,171 A | 12/2000 | Ng et al. | |
| 6,538,431 B2 | 3/2003 | Couchman et al. | |
| 6,917,176 B2 * | 7/2005 | Schempf et al. | ......... 318/568.11 |
| 7,386,163 B2 * | 6/2008 | Sabe et al. | .................... 382/153 |
| 7,555,363 B2 | 6/2009 | Augenbraun | |
| 7,720,570 B2 * | 5/2010 | Close et al. | ................... 700/245 |
| 2002/0016649 A1 | 2/2002 | Jones | |
| 2003/0089267 A1 | 5/2003 | Ghorbal et al. | |
| 2003/0171846 A1 | 9/2003 | Murray et al. | |
| 2004/0013295 A1 | 1/2004 | Sabe et al. | |
| 2005/0145018 A1 | 7/2005 | Sabata et al. | |
| 2006/0151634 A1 | 7/2006 | Pivovarov | |
| 2007/0276552 A1 | 11/2007 | Rodocker et al. | |

(Continued)

OTHER PUBLICATIONS

Goodwillie, David, Swimming on the Hot Side, Popular Science Magazine, Apr. 2012, pp. 55-68, Bonnier Magazine Group, Sweden.

(Continued)

*Primary Examiner* — Dalena Tran
(74) *Attorney, Agent, or Firm* — Osha Liang LLP

(57) ABSTRACT

A configurable robotic apparatus and system is disclosed that is remotely operable in difficult, hazardous, subterranean, or submerged environs. The apparatus merges diverse disciplines to effect inspecting, cleaning, treating, repairing or otherwise maintaining a wide variety of materials and conditions. Deployment environments include power, municipal water and wastewater plants, surface and submerged infrastructures (pipes, lines, conduits), and like industrial applications. Extensible and articulating modules, configurable through standardized and interchangeable connectors, provide unique flexibility, scalability and versatility to accommodate a wide range of shapes, surfaces, and obstacles. In-module intelligence and instrumentation eliminates the need for constant manual control through autonomous operation capable of simultaneous optimization and synchronization of multiple work processes, but manual override and remote control is provided to overcome unanticipated limitations. Benefits include improved efficiency, cost, and safety over prior art. High-performance, one-pass operation reduces facility downtime while incorporating environmentally responsible debris recovery.

11 Claims, 18 Drawing Sheets

(56) References Cited

U.S. PATENT DOCUMENTS

| | | |
|---|---|---|
| 2008/0147691 A1 | 6/2008 | Peters |
| 2009/0234527 A1 | 9/2009 | Ichinose et al. |
| 2009/0276094 A1 | 11/2009 | De Guzman et al. |
| 2009/0292393 A1 | 11/2009 | Casey et al. |
| 2010/0063628 A1 | 3/2010 | Landry et al. |
| 2010/0139019 A1 | 6/2010 | Geppert et al. |
| 2010/0274430 A1 | 10/2010 | Dolgov et al. |
| 2010/0275405 A1 | 11/2010 | Morse et al. |
| 2010/0286827 A1 | 11/2010 | Franzius et al. |
| 2010/0292835 A1 | 11/2010 | Sugiura et al. |

OTHER PUBLICATIONS

Modular Self-Reconfiguragble Robot Systems [Grand Challenges of Robotics].

Robotics & Automation Magazine, IEEE, vol. 14, Issue: 1, Digital Object Identifier:10.1109/MRA.2007.339623, Mar. 2007, pp. 43-52.

DCN Engineering, ROCM (Remote Operated Cleaning Machine), http://www.dcndiving.com/index.php/hydraulic-engineering, Netherlands.

PCT International Search Report and Opinion of Searching Authority (Report has 2 additional prior art citations below), PCT Application #: PCT/US 2012/025557, May 31, 2012.

M. Bahleda, Remotely Operated Vehicle (ROV) Technoloogy: Application and Advancements in Hydro Facilities (TR-113584-V7), Technical Report, Dec. 2002, EPRI, Palo Alto, CA.

Electric Power Research Institute, 54 Fish Protection at Steam Electric Power Plants Program Overview, (2009 Portfolio), 2009, pp. 1-8, EPRI, Palo Alto, CA.

Pipeline Digest, "A Pig for Every Pipe", Jul. 4, 1983, Pipeline Digest, USA.

Oceanology Today, "Dam Good ROV", p. 22, Jan. 1, 2006, p. 22, Oceanology Today, USA.

Kotler et. al., Robotic Removal of Zebra Mussel Accumulations in a Nuclear Power Plant Screenhouse, (Proc. Fifth Int. Symp. Zebra Mussel and Other Aquatic Nuisance Organisms Conf.), Feb. 1995, pp. 253-271, Toronto, Canada.

\* cited by examiner

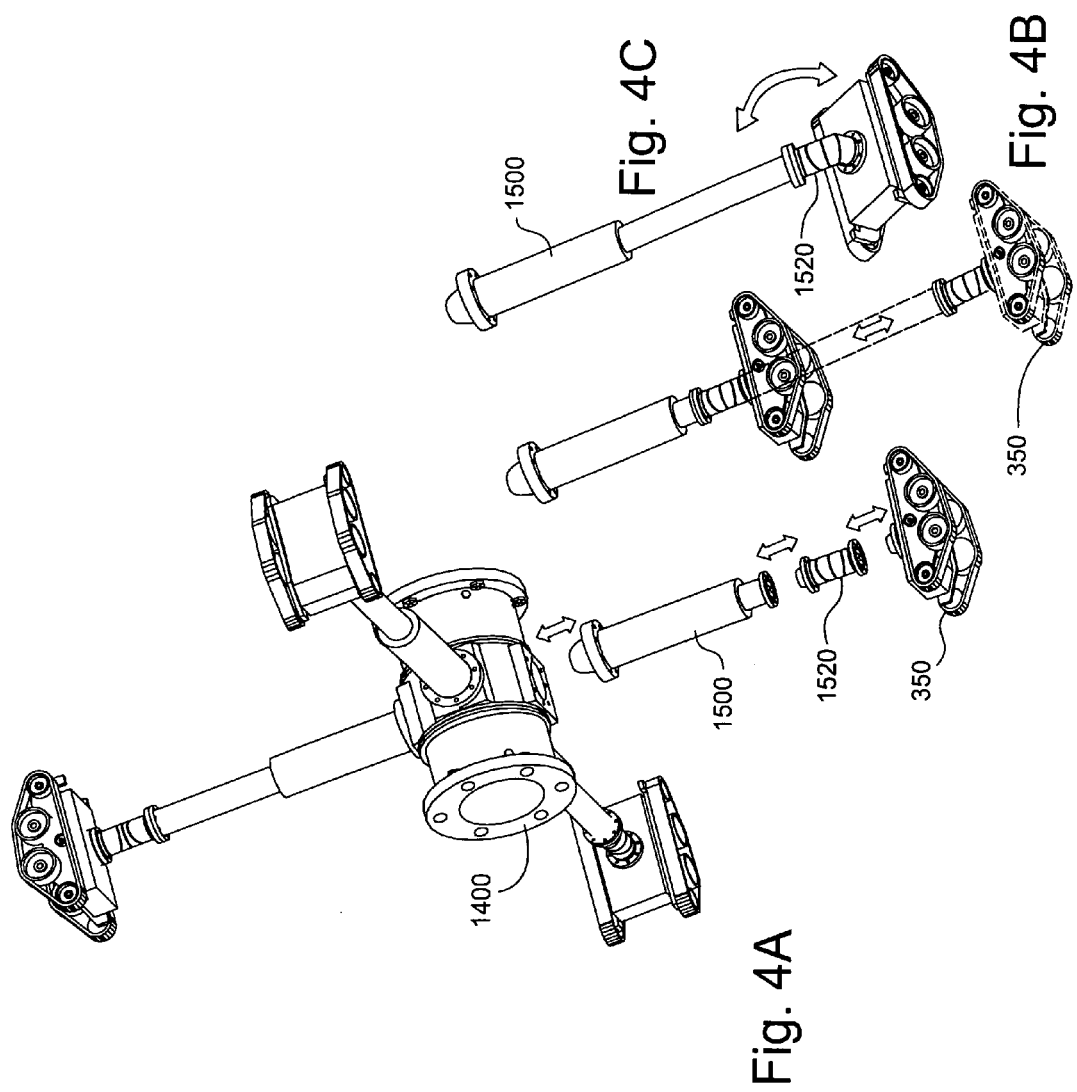

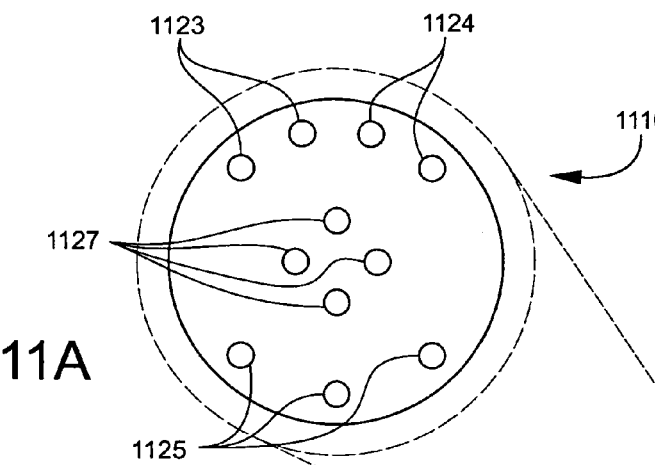
Fig. 11A
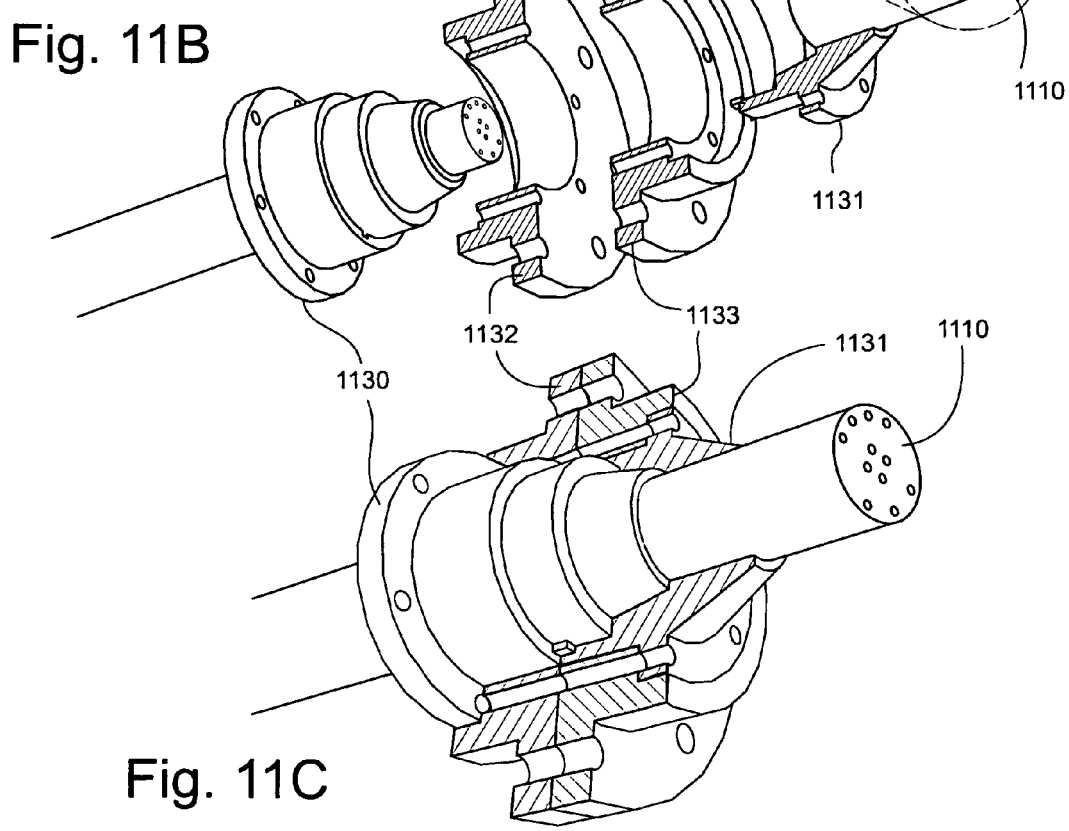
Fig. 11B
Fig. 11C

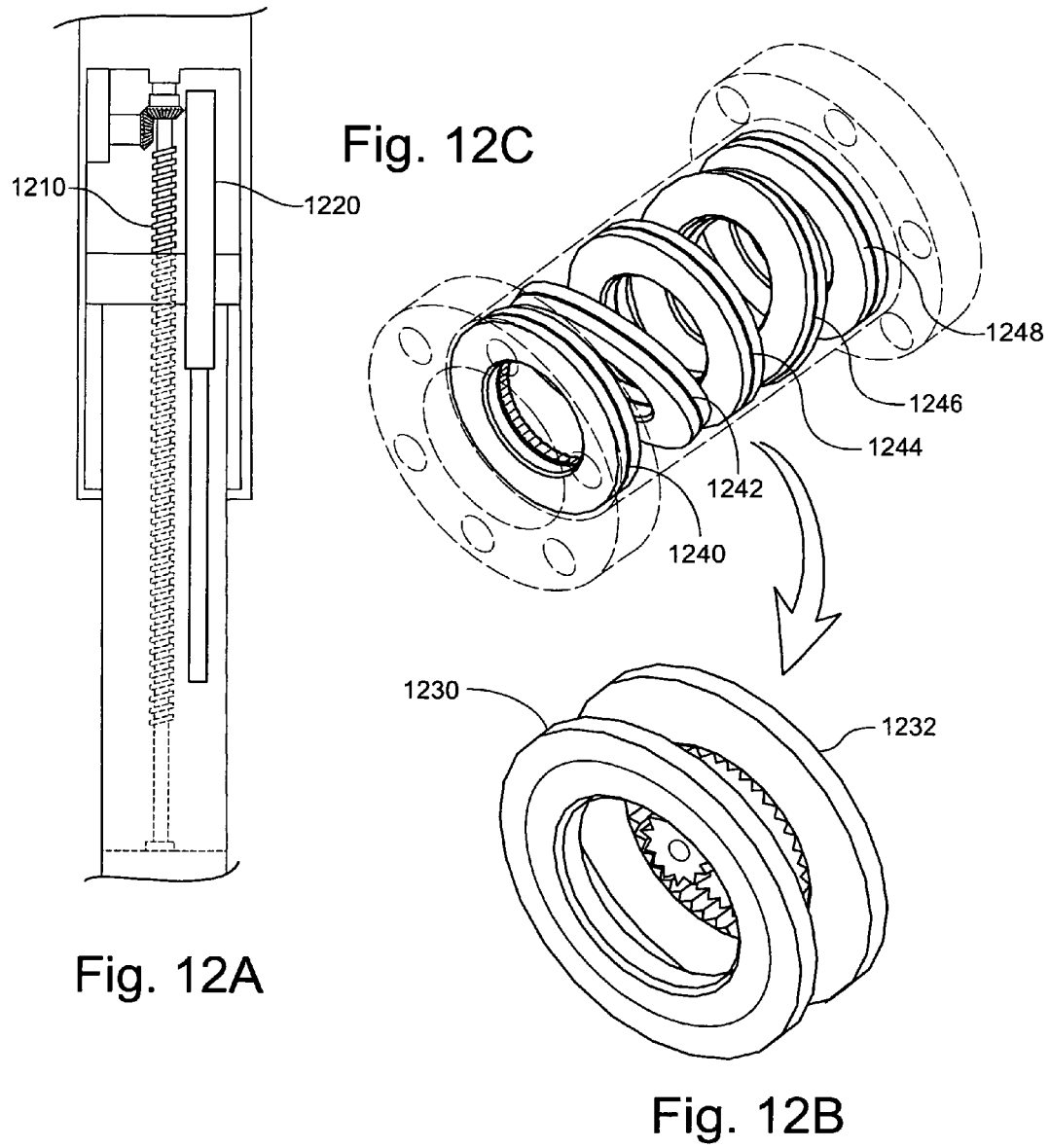

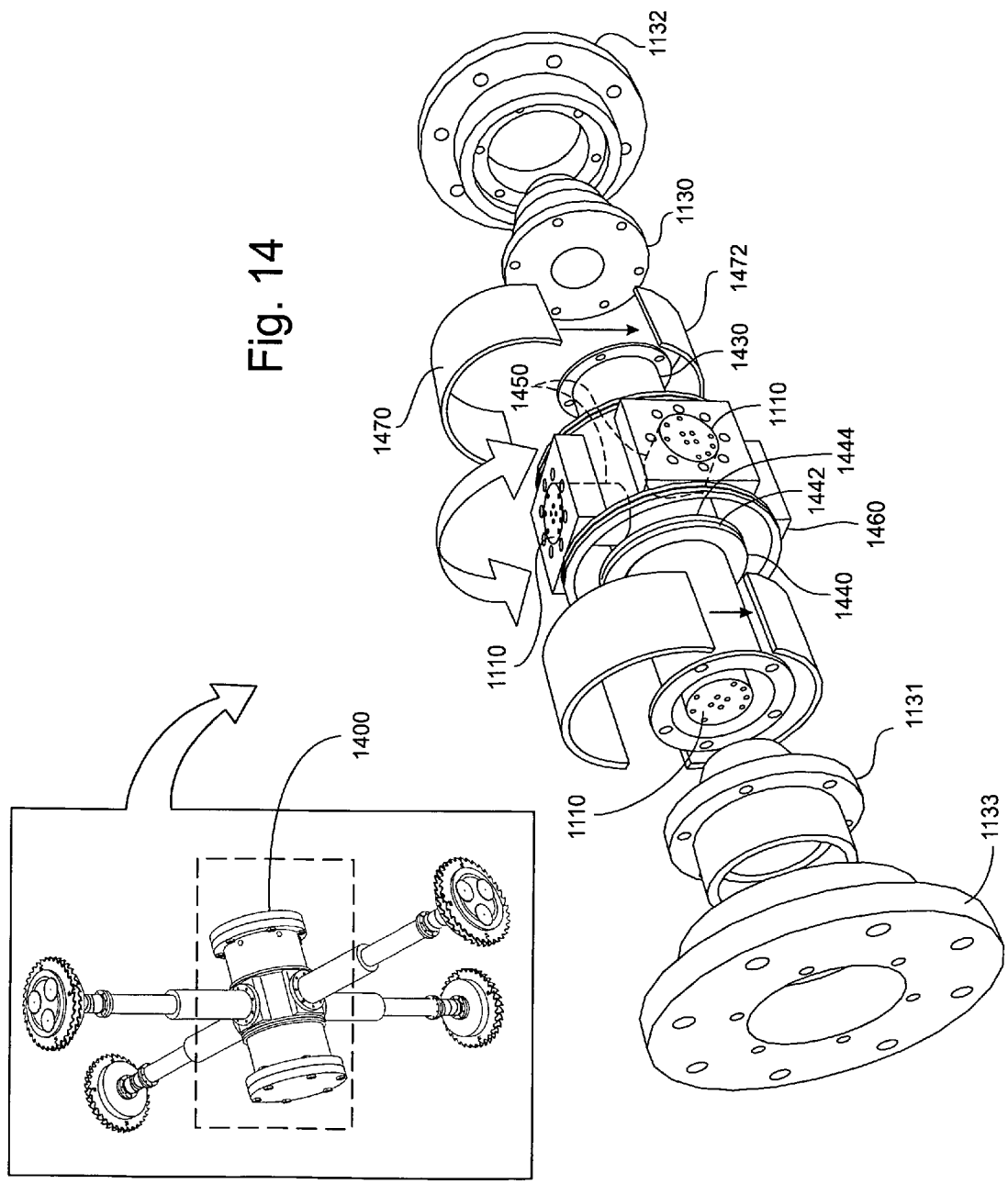

Fig. 19  SOFTWARE FUNCTIONAL ARCHITECTURE

SUBMERSIBLE ROBOTICALLY OPERABLE VEHICLE SYSTEM FOR INFRASTRUCTURE MAINTENANCE AND INSPECTION

FIELD OF THE INVENTION

The present invention relates generally to systems, devices and methods for designing and controlling configurable robots. More specifically, the present invention relates to an apparatus and architecture capable of both manual (human-guided) and automatic (programmed, 'self-controlled' or autonomous) operation; an apparatus incorporating a plurality of interchangeable and interconnected modules and a plurality of interchangeable tools, intelligent closed-loop sensing and control, coordination, synchronization and optimization of simultaneous activities performed by a plurality of attachments, and autonomous detection and avoidance of obstacles and other deviations by articulated attachments. The system architecture and apparatus are intended for robotically-operable remote vehicles to effect the inspection and remediation of infrastructures that are not easily exposed, including underwater or subterranean conduits, pipe networks, dams, basins, abutments, ship hulls, tanks and related infrastructure, although the invention may be applied to a broad range of robotic and ROV technologies and a wide variety of work surfaces (typically a constructed surface). Hereinafter, we use the term "submerged infrastructure" to refer to any infrastructure that is not easily exposed. As applied to infrastructures herein, the term "remediation" refers to any process of repair, rehabilitation, modification, decommissioning, or physical enhancement of that infrastructure, although typically it will refer to a remedying response to damage or undesired changes, irrespective of source. As used herein, the term "debris" refers to any material to be removed from the area of the infrastructure, including solid debris, sludge, attached living organisms, damaged portions of the infrastructure, and so on.

BACKGROUND OF THE INVENTION

Our nation faces a multi-trillion dollar problem in deteriorated infrastructure. The submerged or subterranean portion of many if not most decades-old distribution pipelines, a portion often out of sight and out of mind, is at great risk and in dire need of maintenance, especially cleaning. Affected business and municipal sectors include power generation, petroleum, water, and wastewater management. Analyzing the need, clarifying by example, establishing requirements, and identifying the limitations and disadvantages of the prior art in terms of those requirements can best accomplish proper understanding of these unsolved issues.

The Need

When designated for periodic maintenance, infrastructure remediation is often postponed due to lack of budget in the face of the inefficiencies and high costs of available, prior art solutions. Such postponement only further complicates the maintenance problem and increases costs when the problem is eventually addressed. An apparatus, able to operate at high efficiency and low cost, is required in order to change maintenance from "often deferred" (e.g., maintenance performed when unavoidable and when budget and other constraints permit) into "routine" (i.e., periodically scheduled maintenance). The infrastructure could then be included in scheduled plant maintenance procedures, resulting in ongoing infrastructure operation at original design specification.

Furthermore, the engineering of the original designs and structures tends to become degraded as living organisms encounter and exploit these created ecological niches, for example, as Zebra Mussels adhere to and grow within conduits. Such 'marine fouling' has become a significant and costly problem, and serves as a prime example of both the operation of evolution and of unintended and unsuspected consequences.

An Industry Example

The power generation sector depicts one example of the enormity of the problem of fouling and attendant deterioration of a submerged infrastructure. High volumes of water are required in steam electric generation plants to remove waste heat from steam condensers. About one-half of all larger power plants utilize an open loop (a.k.a. once-through) cooling system (FIG. 2) for this purpose (versus closed loop—for example, recycling water in cooling towers). These systems incorporate submerged intake and discharge conduits, highly susceptible to fouling, and raise environmental concerns.

Effective conduit size is dramatically reduced by even a relatively small amount of fouling on the inside of any conduit. Over and above the reduction of volume, the rough surface of fouling creates friction, causing internal turbulence and effectively compounding the restriction of flow rates. Pumping pressure must then increase to restore the flow rates to that required for cooling.

Unfortunately, achieving higher flow rates via increased pumping pressure requires an exponential increase in pumping horsepower, and in the associated costs. A single large power plant might have to divert millions of dollars worth of electricity for such pumping; electricity that otherwise could be placed onto the power grid. The extra pumping pressure then also puts greater strain and wear on the infrastructure, decreasing its safety and operative life.

Left unmaintained, any growing restriction in diameter will eventually overcome the ability of pumps to provide the required water volume and compensate for the restriction. Plant boiler heat must then be reduced to relieve the potential of backpressure on the steam turbines. Reducing boiler heat impacts electricity production, creating a second source of revenue loss.

Using pumping pressure to increase flow rates has a negative environmental impact as well. As flow rates increase, plankton, fish or even marine mammals are more likely to become sucked into these conduits and die. Regulatory bodies, seeking compliance with the Clean Water Act, and to mitigate entrainment among other issues, are proposing regulatory limits to cooling water flow rates (see, for example, Fish Protection at Steam Electric Power Plants, Electric Power Research Institute, 2009). The removal of marine fouling and sediments from cooling water conduits, so as to increase flow volume, will be the only remaining alternative to increase steam condenser performance.

However, removal of marine fouling is a complex problem. Conduits may have a variety of cross-section geometries that may incorporate angles, changes in diameter, and obstacles. Obstacles may include debris, broken or misaligned infrastructure (such as joints), or infrastructure protuberances (such as curves, slopes, corners, valve bodies and gateways).

When removing marine fouling, the calcified "footprint" deposited by crustaceans must be completely removed, as any remaining traces will support a rapid re-infestation. This complete removal must be accomplished without damaging the underlying work surface. Fouling also never—or 'almost never'—occurs in a uniform layer. During removal, varying thicknesses and densities must be detected and proper corrections made to the rate of axial transit through the conduit, the "bite" of the debris removal mechanisms, and debris recovery processing rates. New regulatory compliance requirements for debris disposal also impact these adjustments.

The volume of debris removed in the remediation of a larger conduit, may approach a ton per lineal foot. An individual chunk of dislodged debris, falling to the floor (i.e., the "invert") of the conduit, may encompass several cubic feet, weigh hundreds of pounds, and create a very significant work process obstacle. It also may pose a significant safety hazard to a human diver in an enclosed environment, particularly if visibility is poor, as it tends to be when water is turbid and lighting is both restricted and limited.

The Requirements

Extensive research regarding submerged infrastructure remediation has identified the failure modes and inadequacies of prior art. The example in the last section, and focus on submerged pipes or conduits (exemplifying a common type of submerged infrastructure), is illustrative of prior art limitations. The overall failure of the prior art for remediation of submerged infrastructures can be summarized by the simple fact that labor-intensive manual procedures are and will remain central ("DAM Good ROV", Oceanology Today, Jan. 1, 2006, especially the second paragraph). No prior art device eliminates the need for manual procedures performed by divers and surface crews without significant disadvantages and limitations (either to address intended functionality or to provide a complete solution).

Requirements for remediation success in the submerged environment include business metrics that are characterized by cost, safety and efficiency. These metrics impact the ability of industry and government to implement any form of remediation and may be broken down into functional requirements. For a given remediation approach to be ultimately effective, it must at least include and address Inspection, Navigation, Scalability, Optimization, and Performance.

These requirements will be referred to jointly via the acronym "INSOP" hereinafter. INSOP provides a common reference point from which to review alternative approaches for remediation of infrastructures.

Limitations of Prior Art

Until the disclosure of this invention, limitations of prior art have failed to achieve the performance automation required to meet safety, cost or efficiency benchmarks. This failure prevents industry or government from remediating infrastructure in any meaningful way. Apparatus in the prior art may be classified into (1) devices for manual use, (2) semi-automated devices, and (3) fully-automated devices.

Manual methods either incorporate de-watering (as used herein, the term "de-watering" is used broadly to mean removing water, sewage, mud, oil, sludge, or other material so as to expose a submerged or otherwise unexposed infrastructure) to allow traditional forms of remediation, or incorporate the use of divers. Divers obviously are not automated apparatus and, at best, use diver-operated tools. More importantly, divers always must put their lives 'at risk' in hazardous environments and in particular, the penetrating into long conduits where there is no direct access to the surface.

Semi-automated methods involve a mechanical apparatus having some form of automated control that makes it less reliant upon diver-operation. These require a user's immediate and continued attention at the remote or monitoring end of the mechanical apparatus, and generally also require considerable experience and skill in order to correctly interpret a limited and indirect set of signals into a reasonable apperception of the events and conditions at the 'cutting edge' of the remote apparatus. The further removed, and the more different, the environment is from that experienced by the operator, the more likely it will be that interpretation will introduce errors. Furthermore, semi-automated methods still require divers to overcome limitations of the mechanical apparatus (e.g., tasks the apparatus cannot perform) or to correct failures in its automated control apparatus. The more removed the operator is from both the apparatus and the environment, the more limited the operator's knowledge of the actual conditions—of the environment and of the apparatus—will be; and the more likely it becomes that an unanticipated and unsensed divergence from the presumed condition will give rise to a problem or even a disaster.

Fully automated methods do not require either an operator's or a diver's immediate and continual attention and continued involvement, but are limited in the types of tasks or environments in which they can perform. For example, the prior art may disclose an apparatus with the ability to perform some level of inspection in an automated fashion, but the same apparatus cannot perform remediation. Alternatively, the prior art may disclose an apparatus with the ability to remediate a round, small diameter conduit, but unable to negotiate obstacles. In all fully automated examples (i.e., autonomous) of prior art apparatus for submerged infrastructure remediation, (e.g. power plant cooling systems), divers must be used to compensate for numerous limitations, a serious, hazardous, and costly disadvantage.

Manual Methods

Submerged infrastructure may be manually remediated by de-watering or by using divers. De-watering permits remediation by traditional land-based techniques. Unfortunately, as infrastructure ages it becomes more fragile and de-watering case histories, chronicling significant structural damage and even collapse, have made de-watering a practice of last resort. Furthermore, the nature of the submerged infrastructure or the material in which it is submerged may make de-watering impractical or even impossible. Deploying divers is the oldest, and still perhaps the most prevalent practice to either avoid de-watering, or to remediate infrastructure where de-watering is not an option.

The manual method of using of divers (FIG. 1A) is the lowest common denominator, and least efficient means to meet INSOP functionality. It has significant disadvantages and limitations. Divers are dependent on visibility for inspection and navigation, which decreases rapidly as a function of turbidity, so that divers must rely on "feel" by the use of hands or feet. Navigation is a further limited by available air supply, tethers, support divers, and safety requirements. Scalability is limited by diver's reach, which must be augmented by erecting scaffolding and adding additional dive teams. Divers are limited to work processes that can be performed using hand-held or hand-controllable implements, and work optimization is limited by human perception, motor control, and responses. Performance is a function of environmental conditions (pollution, temperature, clarity and current); of manual labor, susceptible to fatigue caused by the heavy weight belts that must be worn to offset the kickback of hand-operated implements; and the number of divers that can work within confined conditions without mutual interference and increased hazard.

The prior art includes apparatus to help overcome diver limitations. For divers using water blasters, one such approach is to increase the ablative capability of a given water pressure by replacing the fixed fan spray pattern of the water jet with a specialized nozzle (see, for example, Phovarov, US Patent Pub. No. 2006/0151634 A1). Given the limitations of the divers as explained above, positioning errors result in unacceptable abrasion to the work surface by the more powerful cutting action. Limitations include the lack of means to exactly position this nozzle to the work surface, control the amount of abrasion, and to control uniformity.

Another prior art approach (see, for example, Templet, U.S. Pat. No. 5,431,122), intended to improve diver productivity in the rate of the removal of bio-fouling, resulted in an apparatus resembling an underwater lawn mower. A limitation of this apparatus was the inability to cut more than a "swath" of a few feet wide in any single pass, requiring multiple passes. Other limitations included the lack of navigation aids to maintain a straight cutting swath, blinding of the diver caused by the turbidity of machine operation, and no means to prevent the deadly potential of crushing or drowning of the diver by entanglement should power to the machine be lost and it free falls from the work surface.

Semi-Automated Methods

To overcome the limitations of the manual performance of divers, prior art has introduced semi-automated methods in the creation of apparatus that, for example, has incorporated mechanical scrapers or water jets for debris removal. Such apparatus may be, for example, towed by wire cable, pushed by hydraulic pressure, or moved by self-propulsion. Semi-automated capability ranges from non-intelligent apparatus such as pipeline pigs (FIG. 1B) or other cleaners, to the Remote Operated Vehicle ("ROV" hereafter) utilizing the intelligence of a human being as its operator (FIG. 1C). A general limitation of this method is that all semi-automated approaches still must incorporate diver-operation and divers to overcome limited functionality.

Pipeline pigs (see, for example, Couchman, et. al., U.S. Pat. No. 6,538,431 B2), proven successful in closed systems such as oil pipelines, have been adapted for use in submerged infrastructure such as conduits. The pipeline pig, propelled by hydraulic pressure, breaks debris loose from the conduit walls as it is forced through the conduit. One limitation of these devices is they impede operational flow in requiring a bulkhead to be placed over the conduit mouth to complete the seal with the conduit.

Disadvantages and limitations of pigs are numerous. The pig simply pushes ahead, without any ability to acquire data about the environment and work surface, or to analyze or control the remediation work process as it proceeds. Without the ability to remove accumulated debris or to optimize work processes in response to conditions, accumulation builds in the path of the pig until such time as it becomes stuck. This further creates a navigation problem, as the pig, unable to avoid an obstacle, merely crashes into it. Pigs are not a scalable solution: A different size of pig is required for each size of conduit diameter. As diameters increase, the pig becomes disproportionately less effective. Further disadvantages that impact performance include a lack of means to insert itself into a conduit, supply its own hydraulic pressure, completely clean a conduit in a single pass, free itself when stuck, or to recover the debris that it has dislodged. The Sea Pig (Pipeline Digest, Jul. 4, 1983, "A pig for every pipe") exemplifies the above disadvantages and limitations. This multi-ton projectile, the largest pig of its time, was eventually abandoned for its inability to adequately clean a mere twelve-foot conduit as well as for its tendency to get stuck in the conduit.

Another prior art approach uses the operational flow of water harnessed to rotate mechanical scrapers in the attempt to overcome limitations of the pig (see, for example, Crocco, U.S. Pat. No. 5,146,644). One limitation of this prior art is the requirement of flowing water to rotate fan blades as a (ineffective) source of power. Another limitation is the use of rotating mechanical scrapers without means to prevent their jamming up when encountering a large clump of debris and causing the device to become stuck.

Yet other prior art uses a wire tow cable as a means to move a cleaning apparatus. One such prior art approach (see, for example, Haynes, U.S. Pat. No. 2,201,680) uses the forward progress of the apparatus as the means to power the rotation of mechanical scrapers. In addition to requiring a tow cable, other limitations include the requirement of means to divide towing power between moving the apparatus forward, and rotating its scrapers. This division increases the risk of the apparatus getting stuck or breaking the tow cable.

To reduce the strain of the towing cable, other prior art used external hydraulic power to rotate the scrapers (see, for example, Latall, U.S. Pat. No. 3,740,785). One limitation is the need to supply hydraulic power through a long hose from the surface down to the rotating the scraper motor. Line loss through the hose results in significant power drop. Yet another prior art approach (see, for example Clavin, U.S. Pat. No. 4,027,349) suggested compound rotation as a means to provide some latitude in engaging varying amounts of debris and slight variations in the size of conduits. A set of arms rotated around the axis of the conduit and presented a set of spring-loaded and spinning scrapers to ride over variations in the conduit surface. These limitations represent considerable complexity in apparatus, yet do not provide other than passive means to detect and overcome even minimal surface variations, let alone large obstacles. Furthermore, compound rotation doubles hydraulic power requirements. Still other prior art (see, for example, Murphy, U.S. Pat. No. 5,069,722 or Rufolo, U.S. Pat. No. 5,444,887) has elaborated upon the single apparatus to include support equipment such as cranes, tow cable guidance systems, and catch basins to try and capture some portion of loosened debris.

Another body of proposed prior art has attempted to use water-jetting technology to replace mechanical scrapers. In principle, water jets do not need to make direct contact with the work surface and are not susceptible to getting the apparatus stuck. Early versions of the water jet apparatus incorporated a reduced diameter, sled-like frame designed to enable towing by wire. A disadvantage of this approach was the "kickback" of the jets, buffeting the sled, and causing the sled runner to get stuck at the joints between sections of conduit. The cable would sometimes snap, or the jets would to stay in one place too long and abrade the surface. Yet other prior art exchanged the sled for a "pipe crawler". Motorized wheels and auxiliary propulsion allowed for a more reliable engagement with the conduit surface and this created a more constant transit (see, for example, Hammelmann, U.S. Pat. No. 3,155,319 and Geppert et. al., Patent Pub. No. 2010/0139019 A1). This required yet more motors, increasing power requirements and line loss.

The above prior art, consisting of both non-intelligent and semi-automated methods, beyond the various individual limitations and disadvantages, fail to address INSOP requirements. This failure manifests in an over dependence upon manual methods, such as divers below and large support crews above the surface. With over dependency on manual methods and human participation, these examples of the prior art become economically infeasible.

A Remote Operated Vehicle ("ROV" hereinafter) incorporates the intelligence of a human operator for control. An ROV (FIG. 1C) is a submersible vehicle featuring an umbilical that serves as a tether and a connection to a surface source of power and human control that is augmented by closed circuit video capability.

ROV technology has a growing application in the remediation of submerged infrastructure as disclosed, for example, in "Remotely Operated Vehicle [ROV] Technology: Applications and Advancements at Hydro Facilities," Electric Power Research Institute (EPRI), 2002. This EPRI study identifies basic types of ROV and discusses their relative operational effectiveness.

The study differentiates operational activities into instances where: (1) only divers can perform the operation (i.e., purely manual means); (2) at least one diver must assist the ROV (i.e., semi-automated means); and (3) divers can be completely replaced by an ROV (i.e., fully automated means). The study concludes that the ROV has usefulness for inspection and navigation purposes, but has significant limitations in the inability to perform any maintenance or repair. One cause has been that prior art ROV design has required adapting third-party attachments (such as manipulators) to the body of the ROV as a means to accomplish any work process, and a lack of modularity (e.g., an ROV is either a swimming vehicle or a tracked vehicle, but can not do both).

One example of such a prior art approach combined a standard tracked ROV with a third-party auger dredge (see, for example, "Robotic Removal of Zebra Mussel Accumulations in a Nuclear Power Plant Screenhouse", Kotier et al, February 1995). The objective was to search out Zebra Mussel colonies and remove them by auger dredge and pipe the debris to the surface. The apparatus had numerous disadvantages and limitations. It relied upon divers for inspection, having no other means to manually locate and map colonies of Zebra Mussels. The tracked vehicle was restricted to operation on flat and level surfaces. Debris removal was not scalable, being restricted to a single auger head. It lacked other than visual inspection and guidance (via either human or closed circuit camera) and had no means to control turbidity generated by the auger dredge, which resulted in blind operation. An operator, faced with poor visibility, would fail to locate the mussel colonies or even drive the ROV off course and roll it over. The apparatus further lacked automated means to manage the debris hose after it reached the surface so that debris removal and disposal rates could not be continuously coordinated.

A more promising prior art approach was the creation of a special purpose ROV (see, for example, Spurlock, et. al., U.S. Pat. No. 4,763,376) that integrated its work process tools into its frame. The Maintenance, Inspection, Submersible Transport ("MIST" hereinafter) utilized an umbilical to provide electricity from the surface as the means to achieve sufficient power to effectively remove and process debris in large submerged conduits. Electricity was converted to hydraulic fluid pressure to power the hydraulic actuators in various components.

Adjustable legs and arms could address varying diameters of conduit. A drive wheel, mounted on the outboard-end of a pivoting strut, was utilized to provide traction against the surface of the conduit. Cleaning was accomplished via extendable and rotating cleaning struts fitted with four spinning mechanical scrapers. A debris-processing unit scooped up loosened debris, pulverized it, and ejected it away from the device.

Although designed for semi-automatic and remote operation, the MIST required a diver to operate it and to perform its intended function. A cage-like frame accommodated a dive chamber for transporting the diver along with the ROV.

Despite its promise over prior art, the MIST (and any similar prior art) still suffered significant limitations and disadvantages: Inspection was limited a operator/diver requirement. Navigation was limited by a fixed, non-articulating frame. Scalability was limited by a fixed and non-expandable configuration. Optimization was limited by conflicting requirements: a diver and deadly high-voltage current in close proximity. Performance was limited by reliance on manual inspection, navigation and optimization, and an inadequate debris recovery system.

Fully Automated Methods

Fully automated methods do not require diver involvement but are limited in the types of tasks or environments in which they can perform. For example, the prior art may disclose an apparatus with the ability to perform some level of inspection in an automated fashion, but the same apparatus cannot perform remediation. Similar inflexibility manifests in most of the prior art. This limitation is caused by automated apparatus architecture that is of a monolithic nature and lacking standardized or interchangeable parts. Alternatively, the prior art may disclose an apparatus with the ability to remediate a round, small diameter submerged conduit, but is unable to negotiate obstacles. In all of these cases, divers must be used to compensate for these and numerous other disadvantages and limitations of the prior art apparatus.

The automated ROV (see, for example, Rodocker et. al., US Patent Pub. No. 2007/0276552 A1) incorporates sensors able to perform inspection. The resultant data is compared to pre-determined thresholds and, should a threshold level be exceeded, an appropriate pre-programmed reaction is triggered. Despite various advances applied to inspection and navigation problems, automated ROVs suffer the same limitations and disadvantages of manually operated ROVs.

Control systems for fully automated apparatus, including various types of autonomous or robotic vehicles, are well known in the prior art, but have seen only limited application to systems for infrastructure remediation. In most cases, they have been applied to apparatus having a fixed mechanical configuration and requiring re-engineering whenever that configuration was changed.

U.S. Pat. No. 7,720,570 B2 (Close, et. al.) teaches "Plug-and-Play" attachment of a variety of tool heads and sensors to the frame of a robotic device for subterranean infrastructure rehabilitation. This is accomplished via a "universal interface" (a.k.a. "tool head interface") for standardized connection of interchangeable tool heads or sensors to the device body, and that is movable with respect to the device body. Tool heads and sensors attached via the universal interface are "self-describing" with respect to functionality. The patent fails to disclose how the mechanical aspect of the interface is accomplished beyond including a "power take-off", flexibility, and quick connect capability, and does not teach any method for integrating power and communication interconnection into a single bus. Means for accomplishing component self-discovery, self-recognition, and self-configuration upon connection to a network connected to the control system are disclosed, and these determine functional options presented to an operator on a computer display. Means for locating the robot's position ("localization") are described, including the use of markers detectable by the robot. Movement of a tool head is limited to three degrees of the robot body and three degrees of freedom of the tool head with respect to the robot body. No methods are disclosed for controlled articulation (i.e., movement of multiple parts in different ways at the same time) of a tool head, let alone flexible configuration of a tool head or other attachment to the robot. Although multiple tool heads attached to one robot are disclosed, no means of coordinating the activities of those tool heads is disclosed.

U.S. Pat. No. 6,108,597 (Kirchner et. al.) discloses the use of a planning system for robot navigation, including sensor-based and map-based path planning. An autonomous mobile robot system is provided with a sensor-based and map-based navigation system for navigating a pipe network, taking into account sensor inaccuracy and motion inaccuracy (e.g., due to drift, slip, and overshoot). The system uses position sensing, including recognition of natural landmarks and artificially placed markers, to determine a "plausible position" with respect to a map. A path plan is then developed to reach a goal from the plausible position.

U.S. Pat. No. 7,555,363 B2 (Augenbraun) discloses a multi-function robotic device selectively configurable to perform a desired function in accordance with the capabilities of a selectively removable functional cartridge operably coupled with a robot body. Mechanical characteristics of the functional cartridge are determined automatically. Localization and mapping techniques may employ partial maps associated with portions of an operating environment, data compression, or both. Means to avoid an obstacle are disclosed.

U.S. Pat. No. 6,917,176 B2 (Schempf, et. al.) discloses a gas main inspection system having multiple modules connected in a train, and joint members for interconnecting adjacent modules where the joint members enable articulation of modules in multiple planes and multiple angles with respect to each other.

U.S. Pat. No. 5,548,516 (Gudat, et. al.) discloses a system for positioning and navigating an autonomous land-based vehicle. It teaches means for using a scanning system for obstacle detection, a positioning system to determine vehicle location, and a tracker system to calculate steering and speed corrections.

US Patent Pub. No. 2010/0292835 A1 (Sugiura, et. al.) discloses means for using a planning module, target input interface, a predicting module, and a reactive controller for autonomous robot planning in a dynamic, complex, and unpredictable environments.

US Patent Pub. No. 2009/0234527 A1 (Ichinose, et. al.) discloses an autonomous mobile robot device and teaches means for obstacle detection and path planning for reaching a goal while avoiding the obstacle using various pre-determined avoidance methods.

US Patent Pub. No. 2003/0171846 A1 (Murray, et. al.) discloses methods and apparatus for a hardware abstraction layer for a robot such that the underlying robotic hardware is transparent to perception and control software (i.e., robot control software).

US Patent Pub. No. 2002/0016649 A1 (Jones) discloses a robot obstacle detection system using optical emitters and sensors.

US Patent Pub. No. 2003/0089267 A1 (Ghorbel, et. al.) discloses an autonomous robot crawler for small-diameter enclosed pipes or conduits.

US Patent Pub. No. 2004/0013295 A1 (Sabe, et. al.) discloses an obstacle recognition apparatus and method, including software system for a robot that moves along a floor (planar surface). It is capable of determining the position of the obstacle. US Patent Pub. No. 2009/0292393 (Casey, et. al.) and 2010/0275405 (Morse, et. al.) disclose similar systems for obstacle detection and obstacle avoidance or obstacle following.

US Patent Pub. No. 2005/0145018 A1 (Sabata, et. al.) discloses means to use a wireless sensor network to monitor pipelines.

US Patent Pub. No. 2008/0147691 A1 (Peters) discloses an architecture by which a robot may learn and create new behaviors in a changing environment using sensory input.

U.S. Pat. No. 6,162,171 (Ng, et. al.) discloses a multi-segment autonomous pipe robot frame with articulated joints between the segments.

US Patent Pub. No. 2009/0276094 A1 (DeGuzman, et. al.) discloses an autonomous robot that performs maintenance and repair activities in oil and gas wells, and in pipelines. It uses well and pipeline fluids for locomotion, and sensors, maps, plans, knowledge base, and pattern recognition to plan and achieve goals.

US Patent Pub. No. 2010/0063628 A1 (Landry, et. al.) discloses apparatus and methods for obstacle following (i.e., movement along an obstacle) by a robotic device using a combination of deterministic path determination (i.e., navigation according to a plan) and path by random motion. A sensor system comprising a bump sensor, a debris sensor, and an obstacle following sensor is disclosed.

US Patent Pub. No. 2010/0274430 A1 (Dolgov, et. al.) discloses a method for semi-autonomous navigation comprising creating an obstacle free diagram using topological sensor data about a surface.

US Patent Pub. No. 2010/0286827 A1 (Franzius, et. al.) discloses a robot with a method for processing signals from a video or still camera so as to recognize three dimensional shapes and their properties.

While the foregoing prior art discloses various elements used in the present invention, none apply the combination to achieve the synergism, functionality, and benefits of the present invention.

Summary of Prior Art Limitations

All prior art apparatus and methods for infrastructure remediation, including but not limited to those discussed above, fail to address one or more of the INSOP infrastructure remediation solution requirements, and therefore fail to achieve the advantages and synergy of meeting all of those requirements. Prior art apparatus and methods all have a need for reliance upon manual methods that include divers and surface support crews. These include, but are not limited to, the following, and their numerous combinations, variations, and extensions: divers and their implements; pipeline pigs; specialized apparatus, whether towed, or self-propelled, whether utilizing mechanical means or pressurized water, and whether operating individually or as the central component of a system of supporting facilities; specialized apparatus, whether towed, or self-propelled, whether utilizing mechanical means or pressurized water, and whether operating individually or as the central component of a system of supporting facilities; and, ROV's, whether generalized, special purpose, manual or automated.

SUMMARY OF THE INVENTION

The present invention comprises an apparatus incorporating a particular system and methods that effects the remediation of submerged or subterranean infrastructure. The principal apparatus is the Submersible Robotically Operable Vehicle ("SROV" hereafter). The SROV provides innumerable user-defined configuration possibilities through its highly flexible and versatile modular architecture that leverages standardized and interchangeable sub-parts. The SROV's Module Intelligence and Instrumentation ('MII') provides the basis for a functional automaticity that can be subordinated to manual, i.e. human override to effect non-anticipated but necessary guidance and control. Supporting apparatus, facilities, and software methods for the SROV are further detailed below. As used herein, the terms "proximal" and "distal" are assumed to convey orientation relative to connectivity with the Operations Center (OC—see below) for definiteness of description, although alternative orientations will be obvious to those of ordinary skill in the engineering arts.

This novel and non-obvious modular robotic architecture is an extension to, and unique integration of prior art. Diverse underlying technologies include, but are not limited to, those pertaining to robotics, automation, computer-based modeling, hydraulic and electrical control systems, submersible vehicles, and underwater marine construction. The result is a more realistic, flexible, lower risk, environmentally responsible, safer, and more cost-effective apparatus, system, and method that resolves the disadvantages and limitations of the prior art for the general problem of submersed surface inspection, maintenance and debris removal.

In a general sense, the prior art has involved a dichotomous choice: either human operation was required (whether immediately present or remote) or absent. The SROV shifts this to a range of human involvement where the extent of human operation can be changed during the SROV's deployment to any state from completely absent to remote to 'immediately present' and in control through the MII. A human can, but need not necessarily, operate the SROV—meaning the most mind-numbing, repetitive, and fully-understood conditions can be left to the witless but persistent attention of the machine, unless or until an interrupt or human-ordered interruption occurs.

SROV automation capabilities allow it to overcome numerous limitations and disadvantages of prior art, ranging from the manual efforts of divers to the over-specialized and unaware automation of the remotely operated vehicle. A remotely operated vehicle still requires both constant and detailed control by a remote operator, as well the manual work process assistance of divers and surface attendants. The present SROV resolves the prior art limitation of remote operator guidance through automatic detection and programmed response to anticipated work requirements and conditions, while retaining the ultimate flexibility and adaptively by allowing human operator guidance and control when alerts concerning any unanticipated, exceptional, or interfering problems arise. The SROV resolves the prior art limitation of the necessity for manual work process assistance by meeting all INSOP requirements, and being fully automated, yields high-performance production across a wide spectrum of work processes.

Until the disclosure of the present invention, prior art limitations in addressing cost, efficiency and safety metrics had restricted remediation to a function of periodic maintenance—often unplanned, deferred, and ultimately, mandatory at a great cost. By leveraging automation, the present invention is able to fit into the limited time and budget allocations available for routine plant maintenance programs. In resolving prior art limitations, the present invention transitions remediation from periodic to routine maintenance. The present invention makes it possible for industry and government to afford routine submerged infrastructure remediation, and potentially realize billions of dollars in operations savings.

This summary of the invention is described by way of one illustrative embodiment (unless noted otherwise), and nothing in this section is intended to be limiting. The SROV (FIG. 2) comprises the following major subsystems: (1) an SROV (220); (2) a Mobilization Platform ("MP") (211); and, (3) an Operations Center (230). The latter two are non-SROV facilities and considered SROV Supporting Equipment (see below for more detail).

The SROV comprises a plurality of modular components (e.g., modules and assemblies) designed to facilitate field assembly and configuration as desirable and suitable to the anticipated and, later on, experienced conditions. Certain standard modules are anticipated and described in detail below (see "SROV Module Types"). Any SROV can be re-configured mid-job to cope with a partial breakdown, an unanticipated obstacle, or a task-change. Power and communications are transferred among these modular components via a standardized bus that is incorporated in each modular component. Mechanical, power, and communications connections are effected and mediated by standardized connectors that provide a universal interface. Modules have a common architecture as described more fully below, especially under the section entitled "SROV Module Architecture". Modules and major assemblies have on-board intelligence (e.g., a computer or processor and software) that provides functional control, programmability, automated self-identification (including functionality) on being connected, and collection of data from sensors that instrument the module and/or major assembly. This aspect of the invention is described in more detail below, especially under the section entitled "Module Intelligence and Instrumentation". The resulting modules and assemblies are typically interchangeable (see "Standardized Module Interconnectivity" below for more detail); have a degree of task-specifiable, autonomous articulation and functionality; and offer "plug-and-play" configuration in the field.

A distributed, multi-level control system provides coordination of and feedback across modules, major assemblies, and components, and the SROV, as well as monitoring (see "Distributed Control System" below for details). The SROV can be configured in the field for a target environment. It can be programmed to navigate the submerged infrastructure, perform a remediation work process (including inspection, maintenance, and debris recovery), detect and avoid obstacles or deviations, and extract itself. In many cases, the foregoing activities can be achieved in a fully automatic manner (i.e., autonomously), thus limiting or eliminating the need for continuous human supervision, operation and control.

FIG. 3 provides an overview of one illustrative embodiment of the SROV. Starting from the left side and the end furthest from the Umbilical (385) and Debris Line (387), which connect to the MP and OC, the SROV will progress through a conduit leading with a pair of Shoulder Modules (1400) that can bi-directionally rotate around the conduit's longitudinal axis. From each Shoulder Module extends a plurality of Articulation Modules (1500) fitted with Debris Removal Tools (1600), each capable of a multiplicity of motions for removing debris on the interior surface of the conduit. Next is an assembly comprising a Shoulder Module and Articulation Module, fitted with Track Tools (350) and provides work platform stability for the front of the SROV and propulsion for axial transit. Immediately behind this front drive sub-unit is the SROV Frame Module (1300), containing power and control equipment. Each end of the Frame Module preferably contains at least one Multi-Axis Joint (1350) to enable the SROV to manage bends and twists in the conduit by a flex (e.g., a bend of up to 90 degrees away from the longitudinal axis) or a twist (e.g., a rotation of up to 360 degrees in the plane parallel to the longitudinal axis). Following the Frame Module is an assembly comprising a Shoulder Module and an Articulation Module connecting a Debris Recovery Tool (1700). Next, supporting the rear of the SROV is a second Shoulder and Articulation Module assembly (371) that is fitted with Track Tools and both propulsion for axial transit and stably positioning the Frame module with respect to a work surface. At the rightmost side of the drawing is the end of the SROV with the Power Management Unit (381), Umbilical Connector (383), and Umbilical (385) that links the SROV to the MP.

The MP is a non-SROV facility used to manage the Umbilical and the Debris Line. The Umbilical supplies power to the SROV and communication (i.e. both sensing and control signals) between the SROV and systems external to the SROV. The Debris Line carries debris pumped from the SROV to a Debris Reclamation Interface.

The OC, including the Central Control Unit ('CCU'), is used to plan, manage, and override autonomous SROV activities, provide means for operator-initiated control, and to monitor, respond to, present, display, record, and analyze status signals from the SROV or SROVs. It is interconnected to each SROV via that unit's MP and Umbilical.

ADVANTAGES OF THE INVENTION

The Submersible Robotically Operable Vehicle, leverages modularity, instrumentation, and distributed intelligence to resolve the limitations and disadvantages of the prior art. The SROV and its supporting systems provide an end-to-end automation suite to meet INSOP requirements, while avoiding the requirement for excessive manual intervention:

Inspection limitations of prior art range from the lack of any capability, to a restriction to visual means, or the capability of simultaneous video and sensor recordings for later laboratory analysis. The SROV resolves these limitations (FIG. 6) in its ability to conduct, integrate and model a simultaneous multiplicity of sensor-based techniques. A collection of sensors can effectively form an envelope around the SROV (660 and 670), enabling the operator to be presented with a multi-faceted view and understanding of the 'before and after" of work processes performance. This includes a detailed analysis of remediation performance, and resultant surface and subsurface conditions. Any new sensor can be added with the sensor's designer only having to create the interface between the sensor's inputs and the standardized outputs (visual, aural, haptic) of the SROV, MP and OC. Instead of having to write everything from the 'driver' to the 'GUI', the SROV provides the GUI and API for any application developer.

Navigation limitations of prior art include a restriction to visual means, only having rudimentary pre-programmed or real time guidance, and a lack of flexibility to avoid obstacles. The SROV resolve these limitations in its ability to incorporate sensing instrumentation, intelligent planning, and pre-programmed knowledge of the work area, and having the articulating flexibility (1351) to allow the SROV to autonomously negotiate a wide variety of slopes or curves (FIG. 7). The SROV is able to utilize its sensors and obstacle avoiding or obstacle following programs to be able to negotiate a changing environment (FIG. 8) including the ability to retract its Extensible Arm Unit (1500) or to be able to angle its Wrist Unit (1520) in order to position Tools in contour with changing surface angles or conditions.

Scalability limitations of the prior art include restrictions on the type and level of functionality in a work process. The SROV resolves these limitations by combining a highly modular and reconfigurable design with automated sensing, response, and control. It can flexibly incorporate and integrate multiple types of functionality (including inspection, maintenance and repair) and is able to increase reach, range, and production levels as required to adequately service various infrastructure sizes, geometries, and irregularities (FIG. 10A, FIG. 10B, FIG. 10C, FIG. 10D, FIG. 10E).

Optimization limitations of prior art include restricted coordination of multiple work processes. The SROV resolves these limitations by instrumenting the articulation of its components (e.g., modules), allowing it to coordinate multiple work activities. For example, the SROV may be constantly centered on the axis of the conduit, while simultaneously matching the rates of axial transit, debris removal, and debris recovery as work conditions vary.

Performance limitations of prior art include restrictions on the ability to automate work processes. The SROV resolves these limitations by automating and coordinating any operation that may be implemented via articulating and coordinated attachments. SROV performance manifests by reduced reliance on manual intervention. To increase performance while maintaining a "one pass" completion of remediation, and to reduce required plant downtime, additional modules (FIG. 9) may be added such as an additional Shoulder Module (1400) supporting a second Debris Recovery Tool (1700), and where a "Y" fitting connects the first and second Debris Recovery Tool into a larger diameter Debris Line (930) to accommodate the additional debris processing.

The following is a brief description of the drawings, which are not necessarily drawn to scale.

FIG. 4A is a partially exploded, perspective view of an articulation module.

FIG. 4B is a partial, perspective view of the articulation module shown in FIG. 4A in a retracted (solid) and extended (phantom) position.

FIG. 4C is a partial, perspective view of the articulation module shown in FIG. 4A with a track tool in a deployed position.

FIG. 11A is a sectional view of a bus according to the invention.

FIG. 11B is an exploded, perspective view of a universal connector according to the invention and including the bus shown in FIG. 11A.

FIG. 11C is a perspective view of the universal connector shown in FIG. 11B.

FIG. 12A shows side view of a joint assembly.

FIG. 12B is a perspective view of a joint assembly.

FIG. 12C shows a detail of one embodiment of the joint assembly.

FIG. 14 is a perspective view of a shoulder module.

DETAILED DESCRIPTION OF THE PREFERRED EMBODIMENT

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided herein below with reference to the attached drawings.

The Submersible Robotically Operated Vehicle is a unique and novel, unobvious integration of, and refinement to the prior art. The SROV has transformed the remotely operated vehicle into the robotically operable vehicle. A remotely operated vehicle requires both the participation of a remote operator, as well as divers and surface attendants. A robotically operable vehicle incorporates an end-to-end automation suite that dramatically reduces the need for human intervention yet leaves the potential for conscious and intelligent human control open at all levels.

Figure 1A:
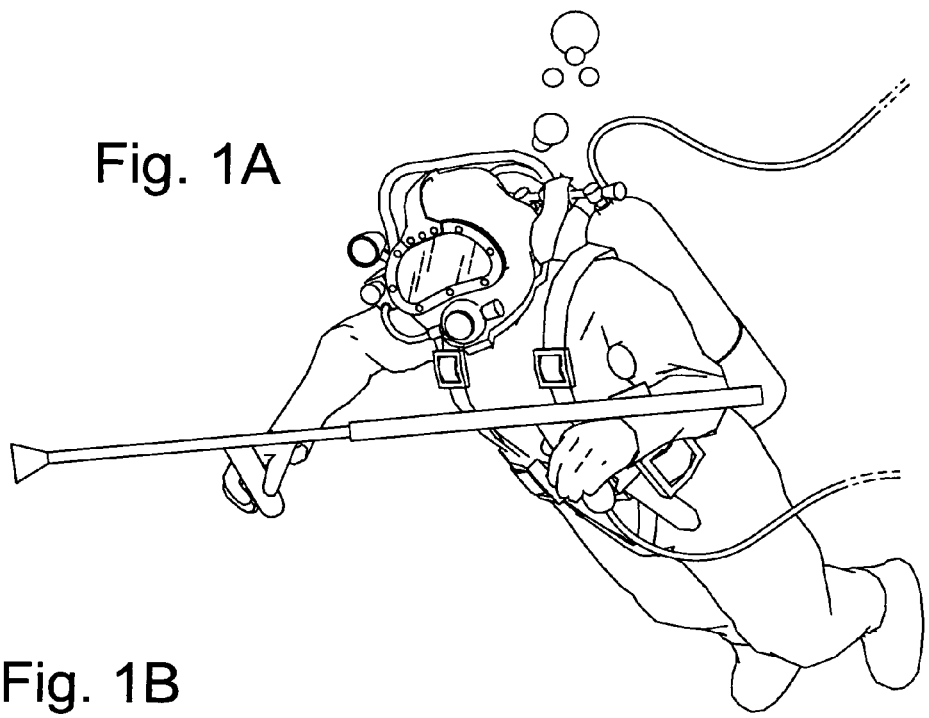
FIG. 1A is a diagrammatic view of a diver-operated spray cleaner according to the prior art.
Figure 1B:
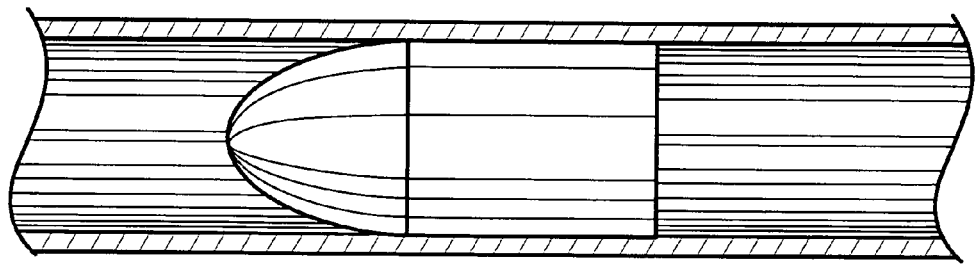
FIG. 1B is a partial sectional view of a pig according to the prior art.
Figure 1C:
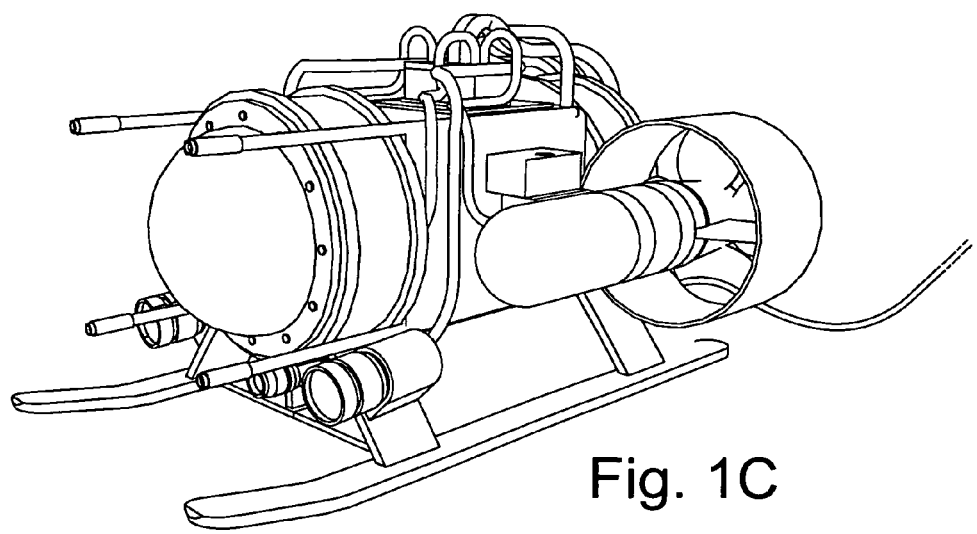
FIG. 1C shows a remote operated submersible vehicle according to the prior art.
Figure 2:
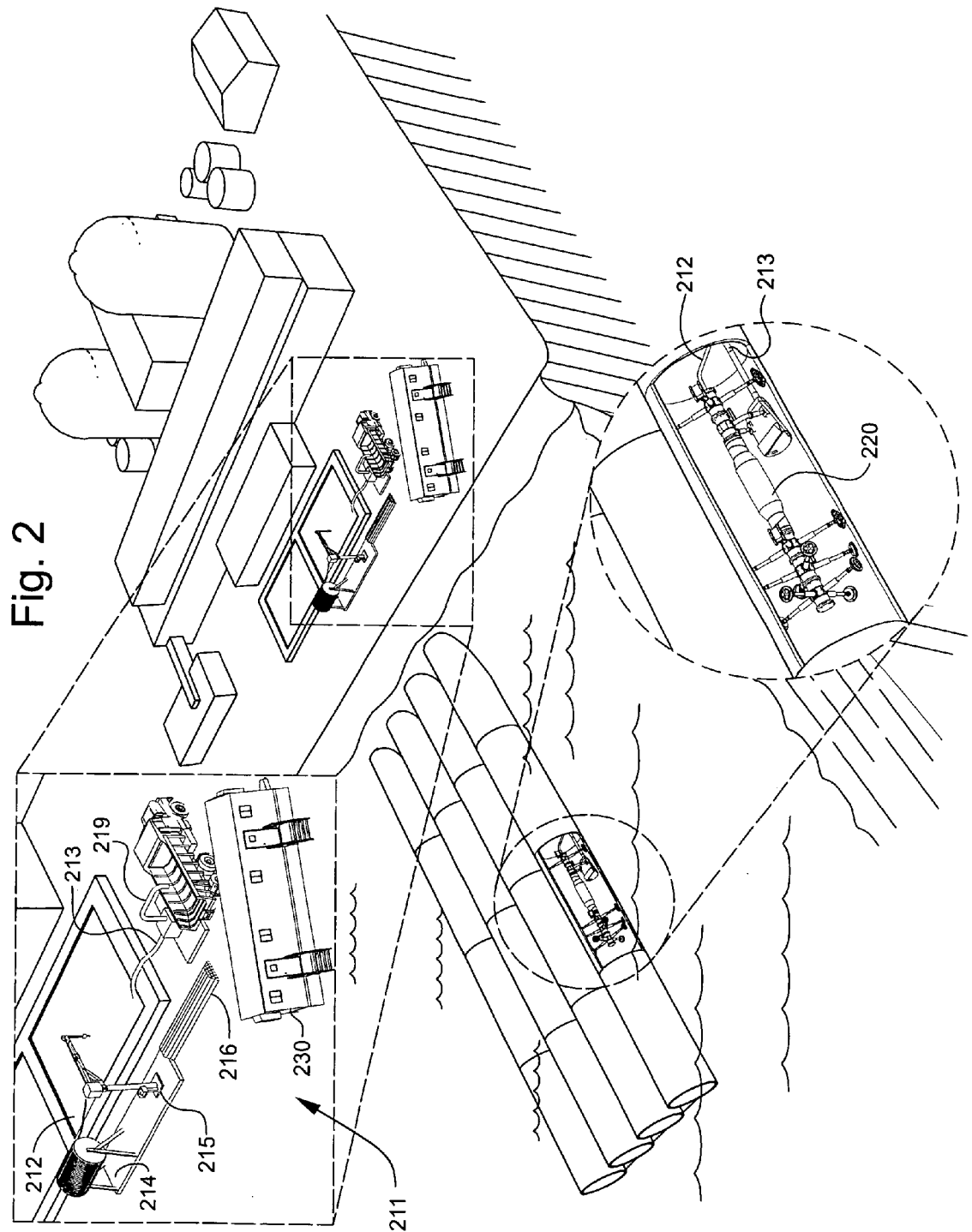
FIG. 2 is a diagrammatic perspective view of an SROV system according to the invention, in which the system is being used to remediate cooling water conduits in a Power Plant.

The preferred embodiment (FIG. 2) is comprised of the following major subsystems: (1) an SROV (220); (2) a MP (211); and, (3) an OC (230). The MP (211) is a non-SROV facility used to manage the Umbilical and the Debris Line. The Umbilical (212) supplies both power to the SROV and communication (i.e. both sensing and control signals) between the SROV and other subsystems. The Umbilical Supply Reel (214) manages the paying out and recovery of the Umbilical in unison with the travel of the SROV. The Debris Line (213) carries debris pumped from the SROV. An overhead crane (215) is utilized to insert or remove sections of debris line hose (216) as to synchronize Debris Line length with that of the Umbilical. The Debris Line terminates into the Debris Reclamation Interface (219) allowing for proper debris disposal. The OC (230), including the CCU, is used to plan and manage autonomous performance by the SROV of tasks, activities, and goals; provide operator-initiated control; and to monitor, present, display, record, analyze, and respond to status signals from the SROV.

SROV Modular Architecture

Figure 3:
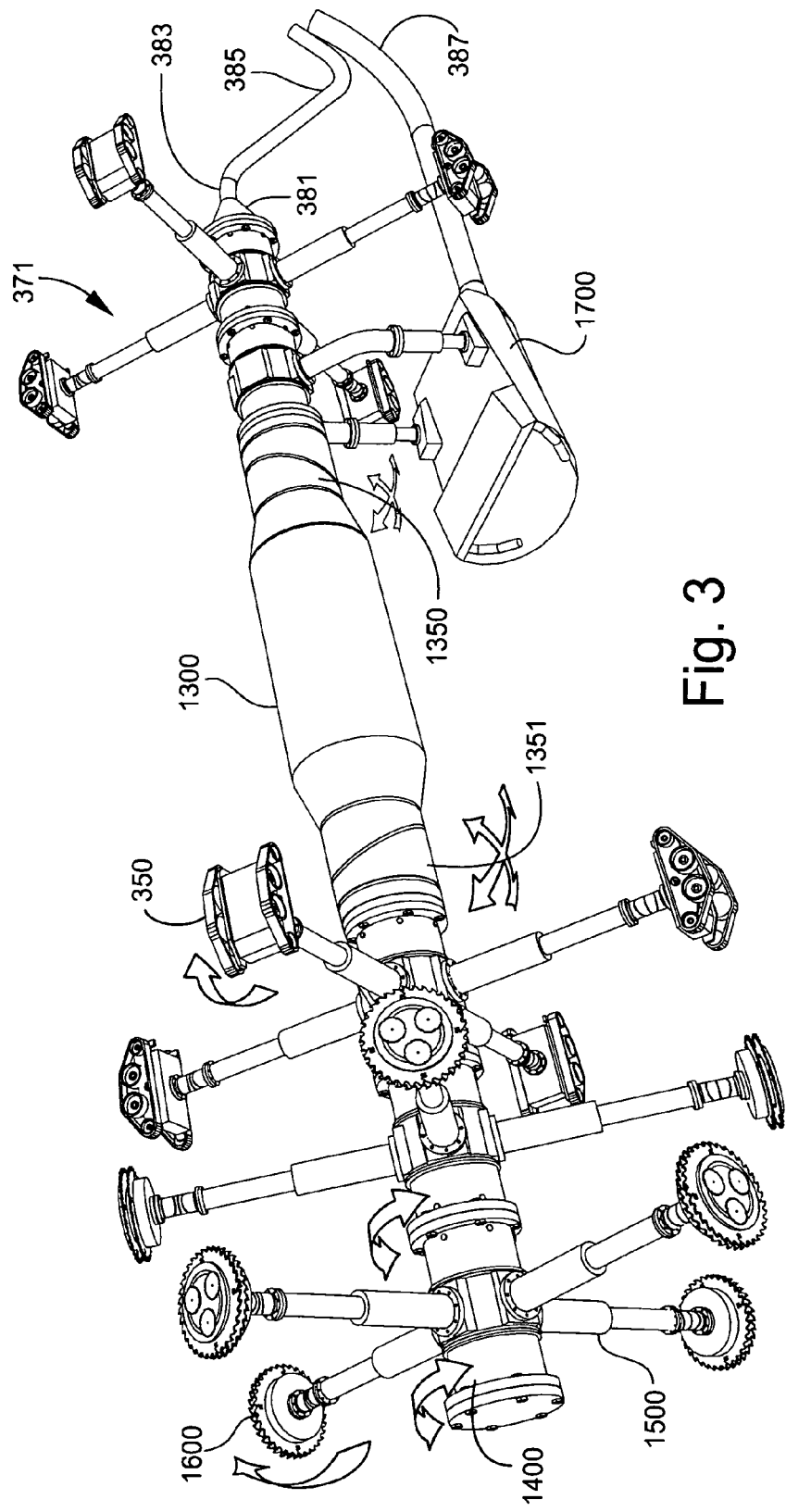
FIG. 3 is a diagrammatic perspective view of an illustrative embodiment of an SROV according to the invention.

The SROV (FIG. 3) comprises a number of standardized assemblies and modules, described below. SROV modules share certain common components, common means for connecting to other modules, and a degree of common construction. The latter includes materials selection for frame and body components and could range from an appropriate composite material, or alternatively, anodized marine grade aluminum, or even a marine grade of stainless steel. These and other selections of material or detailed construction are irrelevant to their novel application.

Each assembly and module capable of articulation uses actuators to control power and movement, and sensors to monitor a plurality of conditions—which in combination effect the instrumented articulation for the SROV at each of the separable levels of module, sub-unit, and SROV-as-a-whole. For any subset of module, instrumentation, actuators, and sensors—one or more modules or sub-modules, for the SROV as a whole—these actuators and sensors may be controlled and monitored within the SROV (e.g., autonomous control), or remotely (e.g., remote control).

The SROV modular architecture incorporates and integrates (1) technologies common to modules, (2) capabilities specific to a particular module, and (3) configurability that aggregates the capabilities of multiple modules. This physical modular architecture is paralleled with internal computer architecture. Encapsulation at a functional level enables implementation details and current sensory feedback to be pushed down to the most appropriate and most readily correlated and correctable level. Problems within a particular module are separate from overall SROV operation, allowing replacement to be managed with a least level of effort. Online, autonomous "track-and-swap" capability, allows for repair without requiring the entire SROV to be removed from service.

In the preferred embodiment, sensors are embedded into all modules to track external (e.g., temperature, pressure, electrical conductivity, chemical toxicity levels) and internal (e.g., connectivity, stress, accelerations) conditions. Each module is capable of 'self-awareness' that can be communicated beyond the scope of an internalized model of the environment, but as experience in real-time.

These actuators and sensors are linked both within the module and to the MP and OC, enabling both local 'reflexes' and remote 'intelligent, conscious control'. For purpose of the preferred embodiment, each combination of OC, MP, and SROV modules function as an integrated whole, spanning operations capacity ranging from the fully automated to fully under human control.

Standardized Module Interconnectivity

SROV components (e.g., the modules, tools, and assemblies described herein) are easily interconnected in numerous configurations so as to provide a wide range of functionality. This is accomplished by standardizing the mechanics and method of module interconnectivity. Standardized Module Interconnectivity comprises both (1) a mechanical means for hardware interconnection of, and transfer of physical resources between, modules, and (2) a signaling means for software interconnection of and transfer of informational resources between modules.

The mechanical inter-module connection means provides support for physical module connection and for the physical interconnection of the Bus, which is the conduit of resources between modules, and is mediated by standardized interfaces. Preferably, the mechanical means serves the dual purpose of a physically stable connection of modules and a protective shield around the Bus where it interconnects to transfer Bus Resources between and across modules. The Bus comprises a standardized set of power conductors (i.e., means for conveying power) and communications conductors (i.e., means for conveying signals) for conveyance of Bus Resources between modules and subsystems. Bus Resources include, without limitation, signals and power (e.g., hydraulic, electrical, pneumatic, mechanical, etc.). Signals may share a common networked conductor (e.g., by multiplexing) and the number and type of power conductors are standardized (and preferably minimized) throughout an SROV (including the modules, tools and assemblies). This approach resolves a prior art limitation, where the mating of conductors depends upon the number and function of conductors, or the type of modules being interconnected, and greatly limits configuration flexibility.

A single, standardized design for each of (a) a SROV power and communication bus ("Bus hereafter") being divided into a plurality of bus segments, (b) a connector, the SROV Plug ("Plug" or "Plugs" hereafter), and (c) a mating connector, the SROV Socket ("Socket" or "Sockets" hereafter), to provide a standard method for physical interconnect of Bus segments running between modules, assemblies, and subsystems. The architecture of the Bus, as shown in FIG. 11A, includes primary hydraulic supply and return lines (1123), auxiliary hydraulic supply and return lines (1124), electric power conductors (1125), and communication conductors (1127). Other or additional connectors, conductors, or alternative means of conveyance may be used in this embodiment.

The hardware interconnection of SROV modules, as shown in FIG. 11B and FIG. 11C, utilizes Plug (1130) and Socket (1131) for simultaneous and transparent hardware interconnect, and to pass the Bus Resources via the Bus (1110) between modules. In this embodiment, a Plug or Socket encapsulates the connectors of the individual conductors of the Bus and passes the Bus between modules by providing connection, seating, and seal (e.g., against pressure, leakage, corrosion, etc.). In some environments, the Plugs and Sockets may be of the "quick connect" and "quick disconnect" variety (well known in the prior art), further improving the ease with which SROV configurations may be effected.

Plug and Socket bodies are machined from non-corrosive metal such as marine grade stainless steel or cast from a high-strength, composite material. For each type of individual bus conductor, a proper seating, and seal (e.g., against pressure, leakage, corrosion, etc.) is provided. The contours of the interlocking nesting between plug and socket create areas for environmental seal by machine fit, incorporation of o-rings, or other approaches well known in the art.

The hardware interconnection architecture, also shown in FIG. 11B and FIG. 11C, includes a pair of Adapters, corresponding to the interlocking profile of the Plug and Socket and having the requisite mechanical structural integrity for cross module interconnection. A plurality of Adapter diameters is incorporated as to accommodate differing diameters of SROV Modules and includes: (1) A Large Plug Adapter (1132) and a Large Socket Adapter (1133), used to provide mechanical connection for the larger modules (e.g., Frame Module and Shoulder Module); (2) A Small Plug Adapter and a Small Socket Adapter (not shown), used to provide mechanical connection for smaller modules (e.g., the Units of the Articulation and the Hand Module); and, (3) An Auxiliary Plug Adapter and Auxiliary Socket Adapter (not shown), used to terminate an Umbilical version of the SROV Bus into a flush mount socket. For the purposes of describing this embodiment, when the term Plug or Socket are used below, in reference to a module or sub-module, the incorporation of the proper corresponding Adapter is to be included by above reference.

An Adapter provides for insertion of a Plug or Socket connector through a receptacle area milled from the center of the Adapter. A lip on the face of this cutout conforms to a reveal in the face of the connectors so as to provide a stop for the insertion. The contours of the interlocking nesting between the connector and the Adapter provide additional areas for environmental seal by machine fit, incorporation of o-rings, or other approaches well known in the art.

To assure proper connection, insertion and orientation, a plurality of alignment mechanisms, such as a notch that corresponds to a groove, are incorporated in the following areas: (1) On a Plug face and corresponding Socket face to assure proper connection; (2) On an outer body of Plug or Socket and corresponding interior of an Adapter cutout to assure proper insertion; and, (3) On an Adapter face and corresponding mating Adapter face to assure proper orientation. Mechanical fasteners affix the Plug or Socket into the corresponding Adapter. Additional mechanical fasteners secure the Adapter, through a plurality of mounting holes located around both edges of the flange perimeter, allowing one side to be bolted to the module, and the other to its mating Adapter.

The software interconnection or communication portion of the Bus provides network connectivity, preferably over a fiber optic cable as the conductor. Signals include, for example, control signals and sensor signals. Control signals convey commands to actuators and sensors. Sensor signals convey, for example, operational information such as status, location, motion, Solution Pattern currently being executed or scheduled, function, damage, history, and current model, and environmental information such as temperature, pressure, and conductivity. Each module contains local intelligence in the form of a Module Control Unit ("MCU" hereafter) (described below) so that the module selectively accepts only those control signals intended for it, and executes only relevant commands. This means, for example, that a module need respond only to module-specific safety constraints (intermodule physical interference or co-positioning efforts will be ignorable by other modules in the SROV unless or until control and tasks of the SROV as a whole, as opposed to the directly contacting modules, are involved. Other localizable subordinate interactions can be embedded such as loss-of-connection responses, blockage or wear warnings, or similar 'local reflexes'. Actuators and sensors within a module are connected to the portion of the Bus used for communication signals via the MCU in that module. The MCU responds to commands, locally collects and interprets sensor signals (including feedback of positioning, movement and other results such as module or environmental measurements), and activates or deactivates actuators. This design provides the mechanisms and information necessary for a complete, closed-loop automation feedback cycle. Preferably, signals are formatted using a standard language for command, control, and sensing, as discussed in more detail below.

Configuration ease and flexibility is achieved by the standardized connections between modules and the ability of MCUs within modules to be interconnected (both mechanically and with respect to Bus Resources) and to communicate, and identify themselves to other MCUs. The Master Module Control Unit ("MMCU" hereafter) and the CCU (described below), without mechanical or software re-engineering—interpret, aggregate configuration, and provide monitoring, control, and functionality of an SROV body and attachments resulting from interconnection. Any of the modules described herein may be interconnected with "plug-and-play" simplicity, thereby enabling the SROV with the functionality necessary for a wide range of work processes and environments. Integrating tactile or 'haptic' sensors at any level of module enable real-time, real-world coordination between operating model and real world conditions of both environment and that module itself. Field operations personnel can easily configure SROV modules (described above) and in support of an unlimited array of work processes and environments. This includes the automated remediation for any of the following: interior infrastructure surfaces as characterized by size, geometry, and irregularities (e.g., curves, slopes, angles, or protrusions); exterior infrastructure surfaces; a variety of types and amounts of fouling; and, specialized tasks by easily integrating third-party or custom tools.

Module Intelligence and Instrumentation

Each module of the SROV incorporates both on-board or module-specific intelligence and instrumentation (the 'MII' first referenced above) that are interfaced to the communication portion of the Bus. Preferably the on-board intelligence is a programmable computer having at least a memory unit, a processing logic unit, a stored program for the module suited to the processing logic unit, and an I/O unit or on-board sensor and instrumentation. Input is taken regarding the module's external environment and internal status, and output is produced regarding motion or current status for the module. On-board intelligence is pre-programmed to control the detailed functionality of the module responsive to external signals (both control and sensory) and to collect and aggregate data from the instrumentation. This provides each module with a degree of articulation and the means for the control and monitoring of that articulation as well as the monitoring of the resultant effect upon the experienced environment. Thus a Track Tool could have intelligence and sensors focusing on position, location, energy usage, internal temperature, drive tread motion, and pressure; while a Debris Removal Tool might have intelligence and sensors focusing on spin, resistance, temperatures, pressure, and surface conductivity.

An interruptable but closeable loop feedback and control system is created by the instrumentation of SROV motion, the observation of SROV location or other operations within the external environment. Feedback collectively includes signals or information from any output device, or actuator; any sensor for the external environment; any sensor for the internal status; any on-board logic-processing and memory units or any embedded program. These may be monitored and controllable through automated, automatable, or manual efforts at the MP or even the OC providing the feedback link for an interruptable but closeable loop feedback and control system.

Control signals, received by the module over the Bus are filtered to determine if they should be implemented within the module. Signals are transformed, according to Control Templates, from generic commands (e.g., for positioning and movement) into the detailed commands necessary to achieve the desired result using the actuators within that particular module. Sensors respond with feedback of positioning, movement and other environmental results to provide a complete, closed-loop, automation feedback cycle, and as more fully described in the Distributed Control section below.

Mechanical motion of a module is generated and governed through a set of standardized actuators, joint assemblies, and sensors. This includes control of the mechanical movements required of the actuators, as well as the monitoring and feedback of the results and impact of the actuation. Standard joint assemblies include but are not limited to: (1) A Sliding Joint Assembly (FIG. 12A) is incorporated into the Articulation Module as well as various Tools to provide means for controllable inline motion or extension; (2) A Rotary Joint Assembly (FIG. 12B) is incorporated into the Shoulder Module, as well as various Tools, to provide controllable rotation capability; and, (3) A Multi-Axis Joint Assembly (FIG. 12C) is incorporated into the Frame Module and Wrist Unit, as well as various Tools to provide controllable multi-axis articulation and rotary positioning (i.e., radial orientation). Not excluding other potential embodiments, the Multi-Axis Joint Assembly consists of a plurality of Rotary Joint Assemblies and where one set is positioned perpendicular to the longitudinal axis of the joint (1240, 1244, and 1248), while another set is positioned at an offset angle (e.g., twenty-two and one half degrees) (1242 and 1246) in this embodiment. As additional Rotary Joint Assemblies are added, the overall possible angle of the articulation for the joint increases. This above approach provides an accurate radial and rotary positioning while providing an exoskeleton for internal routing of and protection of the Bus.

Each individual joint assembly utilizes standardized parts and comprises: (1) a Drive Sub-Assembly (1210 and 1232) to create the proper articulation; (2) a Bus Sub-Assembly (1220 and 1230) to route the bus across the mechanical connection; and (3) a Control Sub-Assembly (not shown) to operate the actuators and monitor the sensors as to intelligently instrument its articulation and enable current-status feedback and control.

The Drive Sub-Assembly consists of a Mechanical Coupler, Drive Mechanism, and Hydraulic Actuator:

The Mechanical Coupler enables the desired articulation (e.g., differential, inline, linear, radial, or rotary) and is constructed to provide the requisite structural integrity as to be able to withstand moments of inertia and other load factors. It is comprised of hardened and corrosion proof materials and has bearing surfaces of a proper material to assure a smooth and stable motion as well as reduced friction and wear.

The Drive Mechanism incorporates a self-locking mechanical drive (i.e. worm drive, or screw jack), and is thereby able to avoid the possibility of reverse torque from altering position. It eliminates the need to provide constant power to the actuator (motor) as a means of holding position, and avoids the potential of premature wear or failure.

The Hydraulic Actuator provides the force to power the Drive Mechanism as to control and manipulate the Mechanical Coupler. It is fabricated from corrosion resistant materials, is sealed in an environmental housing, and is further protected by a bath of dielectric oil.

The Bus Sub Assembly consists of the Bus Conductors (power and communication) within the Joint Assembly and the requisite Bus Coupler to transfer Bus Conductor connections across the motion of the mechanical coupler (i.e. inline, linear, radial, or rotary). It is packaged in an environmentally protected housing to protect against corrosive elements and may be co-located with the Control Sub-Assembly within the same housing.

The Control Sub Assembly includes a positioning sensor to indicate the position of travel of the mechanical coupler, additional associated sensor arrays as required to instrument articulation issues (e.g., speed, acceleration, force, pressure, and resultant environmental or other conditions), means to collect and transform sensor data into meaningful feedback in support of autonomous operation, and interpolation of sensor feedback into a self-model of localized constraints and 'reflexes' (stimulus-response without override).

Each module and assembly contains within itself the above described on-board intelligence and instrumentation, and physical and mechanical means, These are synchronized in an on-board and internal self-model, which is stored in the memory. The processing logic unit uses signals from the instrumentation (e.g., sensors), both for performing design functions, and for enabling real-world comparison between the module's self-model and the reality it currently senses and affects. The use of a standardized and encapsulated modular programming structure allows localized signal/sensory performance guidance as well as transmittable feedback on goal attainment. Specific exception recording can account for unit deviation from standard expectations (e.g. wear-caused degradation) without requiring or affecting overall reprogramming of either the SROV or other modules.

Figure 5A:
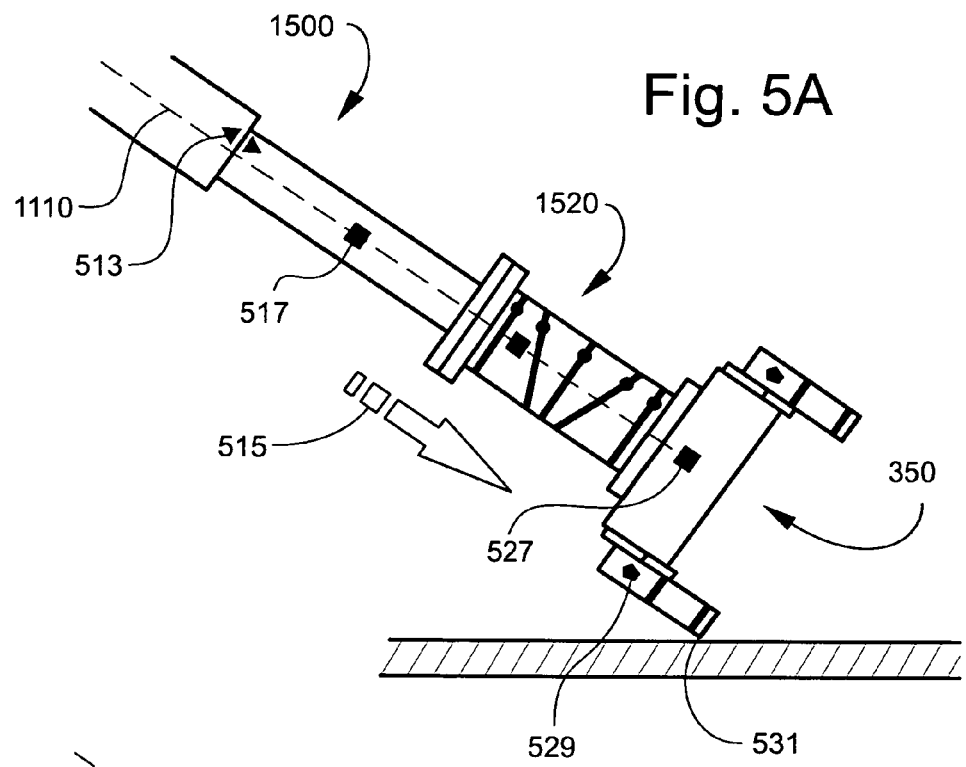
FIG. 5A is a front side view of an articulation module, a hand module, and a tool before being leveled.

As exemplified in FIG. 5A, the MCU (527) residing in Track Tool (350), decodes a command from Bus (1110) to make contact with the work surface as had been issued by the OC. In response, the Track Tool MCU (527) generates a signal onto the Bus requesting forward extension. This signal is decoded by MCU (517) located within the Extensible Arm Unit (1500). In response, MCU (517) activates Linear Actuator (513) to begin a powered forward extension (515). Upon the inboard track making contact with the work surface (531), the associated inboard track sensor (529) indicates contact via increased pressure. In response, Track Tool MCU (527) generates a signal onto the Bus to halt extension. The Extensible Arm MCU (517) decodes this signal and in response, deactivates Linear Actuator (513).

Figure 5B:
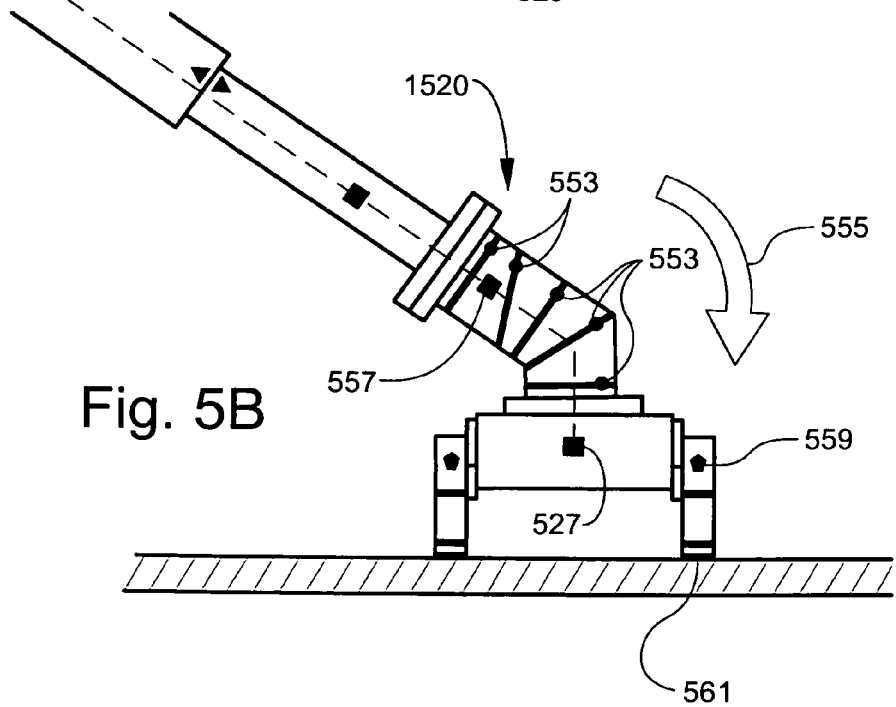
FIG. 5B is a front side view of the articulation module, the hand module, and the tool after being leveled.

As exemplified in FIG. 5B, a similar process is repeated where the Track Tool MCU (527) generates a signal onto the Bus to square up the Track Tool upon the work surface. The MCU (557), located in Wrist Unit (1520), decodes the signal and in response activates Multi-Axis Actuator (553) to begin an axial articulation (555) to rotate the Track Tool down onto the work surface. When the outboard track makes contact with the work surface (561), and the associated outboard track sensor (559) indicates equal pressure to inboard track sensor (529), in response, Track Tool MCU (527) generates a signal on the Bus to halt articulation. Wrist Unit MCU (557) decodes the signal, and in response, deactivates Multi-Axis Actuator (553).

Sensors include any of the set of possible internal-to-the-module sensors (e.g., position, orientation, speed, electronic resistance, magnetic, accelerometric, force, pressure or chemical differentiation, angular deflection, haptic, self-check diagnostics, and other conditions) that are desirable to affect a feedback linkage between current condition and modeled norms for the module, both as to its function and status.

Any of a number of specialized tools (e.g. grinders, propellers, treads, pumps, jets, welding apparatus, sealing apparatus, levers, hammers, jacks, grippers, caulkers, and other standard mechanical and physical repair and maintenance devices) can be an operable part of any modular component, a device subject to that modular component's effort. Each operating tool, or device, or each actuator for placing the modular component or SROV into the proper position, will be linked with appropriate external and internal sensors to form the feedback link which can communicate the tool's effect on both the external environment and the module and thus, on the SROV.

SROV Module Types

The SROV comprises a plurality of modules (inter-connectable via the previously described Module Interconnection Technology) categorized by functional types and having a common architecture. These include at least the following types (FIG. 3): Frame Module, Shoulder Module, Articulation Module, and Hand Module.

Figure 13:
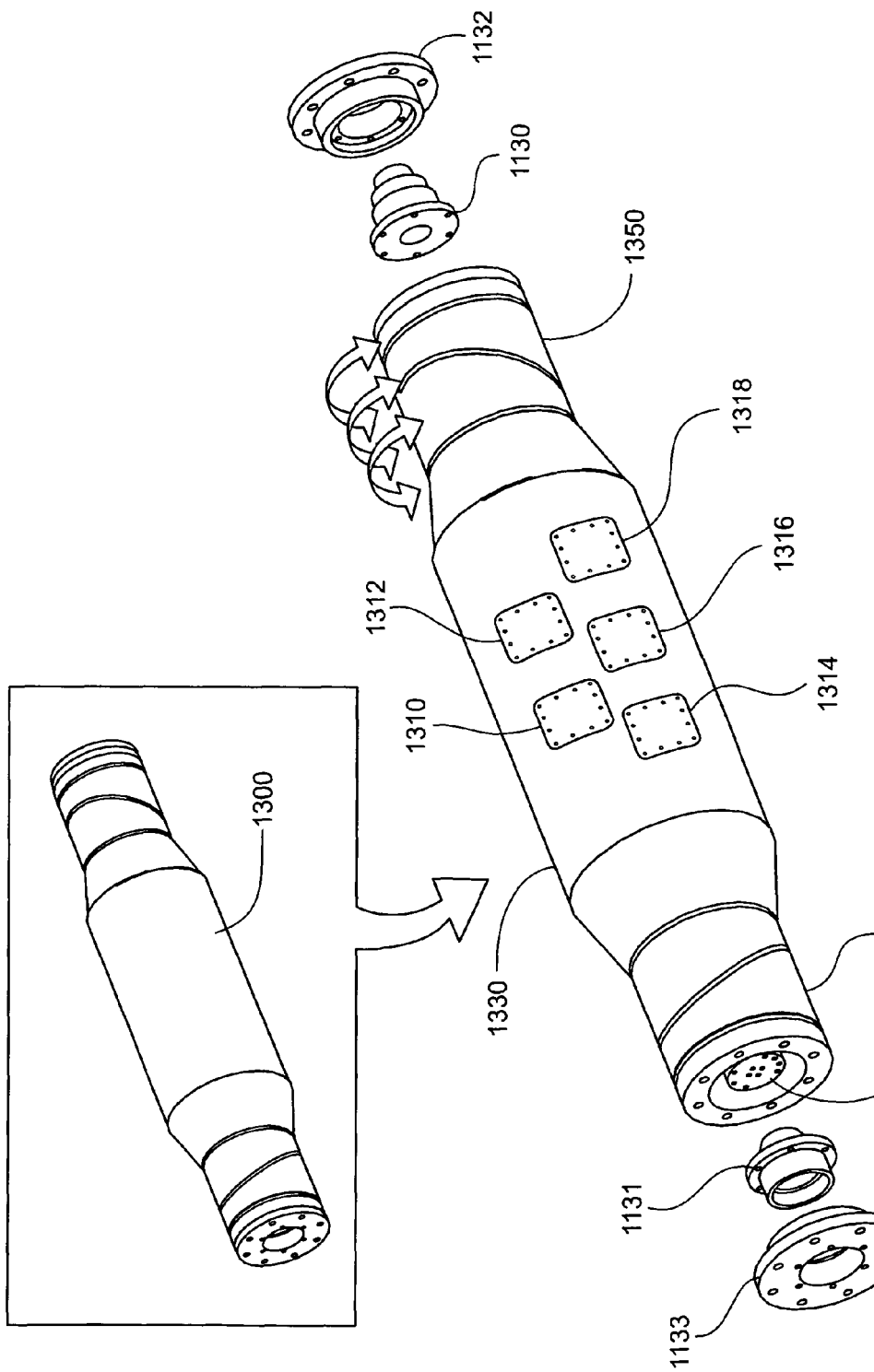
FIG. 13 is a perspective view of a frame module.

A Frame Module (as shown in FIG. 13 and for the purposes of the Preferred Embodiment) is an articulatable "spine" (1300) that provides the foundation upon which the SROV is built and forms its "core." To enable flexible navigation, either end of the frame is fitted with a Multi-Axis Joint Assembly (1350 and 1351). The Bus (1110) is passed through the joint assemblies terminating in a Plug (1130) and Adapter (1132) at the proximal end Socket (1131) and Adapter (1133) at the distal end. Shoulder Modules may be connected to either end of the Frame Module, or alternatively, multiple Frame Modules may be interconnected to extend the body of the SROV and expand its functionality, while permitting articulation. Enclosed in an environmentally protecting tube (1330) of the Frame Module are the following units, which contain all of the sub-systems required to manage, monitor, operate and navigate the SROV, and including but not limited to:

The Master Module Control Unit (1310) to both receive control signals from and communicate data signals to the CCU; to register (e.g., identification, functionality, and configuration) and to then monitor and provide coordinated control of the modules and assemblies attached to the Frame Module by the issuing of control signals to, and by the aggregating of data signals from, the MCUs located within these other SROV modules and assemblies.

Module Control Unit (1312) specific to the Frame Module as to operate internal Module equipment including the monitoring of thresholds of sensors for values that have been or are about to be exceeded, and if so, to generate signals onto the Bus indicating the need for corrective action, enabling either the CCU, the MMCU, or both operate and navigate the SROV.

Sensor Bay (1314) to house sensors oriented to general operations and navigation and that may include sensors to detect orientation (e.g., lateral and longitudinal trim, depth, etc.), tilt (e.g., pitch, yaw, or roll), position (e.g., external references, transit, natural landmarks, or artificial landmarks from which SROV position may be computed relative to a map), and control sensors to indicate all critical operational aspects of the SROV (e.g., fluid pressure, voltage, amperage temperature, etc.).

The Hydraulic Power Unit (1316) converts electrical power into hydraulic fluid pressure so that it may be delivered through the power portion of the Bus. An electric motor, housed in a chamber of dielectric oil, extends its shaft through a rotary seal as to connect to a hydraulic pressure pump. The pump side of the chamber is filled with the hydraulic fluid that serves as the pump reservoir. The pump feeds into the supply side of the Bus, while the return line of the Bus feeds back into the reservoir.

The Failsafe Unit (1318) provides emergency override and comprises a set of redundant critical components (e.g., MMCU and MCU, an Auxiliary Hydraulic Power Unit, an Emergency Control Unit, and an emergency power back-up battery bank including a charging circuit). It implements software and hardware to automate failover to those components in event of a failure of primary components of the SROV. A back-up battery bank powers SROV emergency procedures (e.g., shutdown, report, retraction, return or other).

The Failsafe Unit monitors signals and operational conditions via the Bus. It may be triggered in response to receipt of an explicit command or may be programmed to be triggered on a detection of wide variety of input signals, and predetermined or abnormal conditions such as power failure, component failure, loss of communication with the CU, etc. On detecting such a condition, it activates a corresponding failover procedure that may include emergency shutdown or other responsive procedure subject to situational constraints.

Failover or emergency shutdown procedures may, for example, retract all articulators and place vulnerable electronics or mechanics in a safe mode in preparation for manual extraction. Alternatively, an emergency SROV self-extraction program may be triggered, depending on the last known status report(s) available to the Fail-safe Unit, causing the SROV to "back out" of the conduit by at least partially reversing its recorded path. Additionally, a Fail-Safe Unit will have on-board memory, processing, and program components comprising the control and operating management device to implement automated operation of pre-programmed, situation-specific tasks as best match up with the last signal inputs stored and received before the loss of umbilical-provided power; and a set of stimulus-response programmed activities stored in the on-board memory, against which the on-board processing component compares the last signal inputs stored and received to determine and activate the best matching response, using the same last signal inputs stored and back-up battery bank power limit as the situational constraints on the selection.

A Shoulder Module (FIG. 14) comprises a controllably rotating frame around a central shaft connectable to a plurality of Articulation Modules, and provides means for the radial rotation of a plurality of Articulation Modules around a Central Shaft. A plurality of Shoulder Modules may be configured in an SROV. Position and orientation, both localized and global, of the rotating frame may be sensed via the Bus and on-board sensors for the Shoulder Module or a specific sub-portion pertinent to a specific sensor. The Shoulder Module (1400) specific components and assembly comprises:

- A Central Shaft (1430) contains Bus (1110) and where the proximal end of the Central Shaft is affixed with Plug (1130) and Adapter (1132). The shaft distal end is affixed to Socket (1131) and Adapter (1133). This allows the transparent interconnection and passing of Bus Resources between the Shoulder and Frame Module or between a plurality of Shoulder Modules.
- Rotary Joint Assembly (1444) is fitted to rotate upon Central Shaft (1430). The proximal end of a plurality of Sockets (1450) (four in the figure) are affixed to Rotary Joint Assembly (1444) and preferably arranged in a radial and equi-angular manner. The distal end of said sockets are affixed to Articulation Module Frame (1460).
- A Bus Splitter (not shown) is installed within the Central Shaft as to provide the Bus (1110) into the inner section of a Bus Sub-Assembly (1440) that is affixed to the Central Shaft (1430) adjacent to Rotary Joint Assembly (1444). Affixed to the outer section of said Bus Sub-Assembly is a second Bus Splitter (not shown) and in this embodiment, the outputs connect the Bus (1110) to the Sockets (1450) (four in the figure), and to the MCU (not shown) for the purpose of governing Drive Sub Assembly (1442) co-located with Bus Sub-Assembly (1440).
- A Protective Cover is installed on either side of the Articulation Frame and comprises a Top Section (1470) and Bottom Section (1472).

Figure 15A:
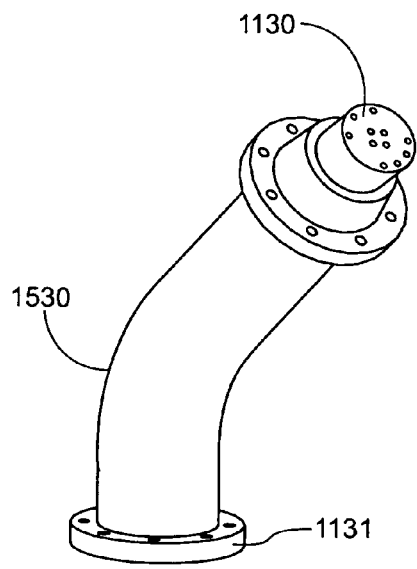
FIG. 15A is a perspective view of an articulation module that is an elbow unit.
Figure 15B:
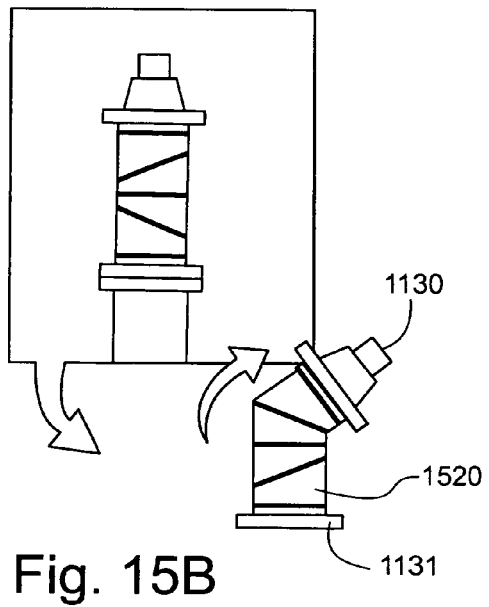
FIG. 15B is a side view of an articulation module that is a wrist unit.
Figure 15C:
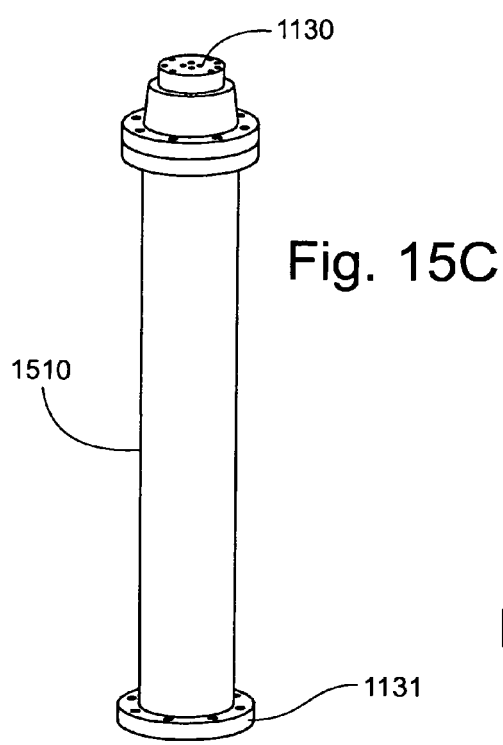
FIG. 15C is a perspective view of an articulation module that is a fixed arm unit.
Figure 15D:
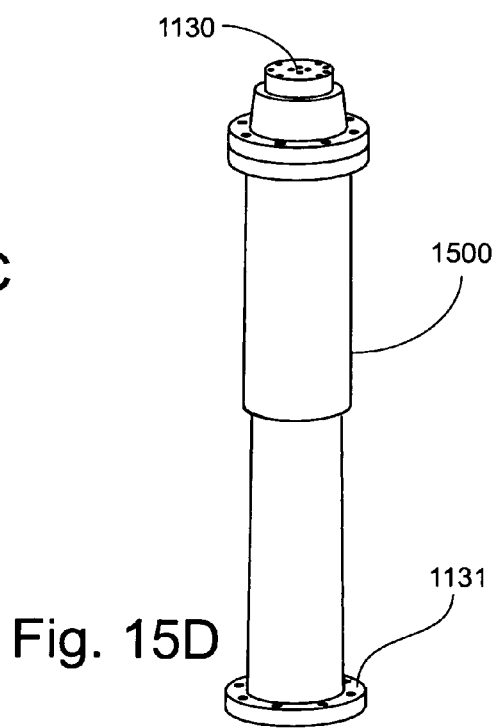
FIG. 15D is a perspective view of an articulation module that is an extensible arm unit.

The Articulation Module consists of a plurality of inter-connectable types of Units, deployed in various configurations to provide greater articulation, and that singly or in combination will comprise a complete Articulation Module:

- Specific types of Units include at least: (1) (FIG. 15A) An Elbow Unit (1530) to provide means for redial realignment of an Arm Unit and may be configured in a plurality of different angles; (2) (FIG. 15B) A Wrist Unit (1520) incorporating a Multi-Axis Joint to provide multi-way articulation and rotary positioning; (3) (FIG. 15C) A Fixed Arm Unit (1510) that may fashioned in a plurality of lengths; (4) (FIG. 15D) An Extensible Arm Unit (1500) that incorporates a Sliding Joint Assembly as to be able to extend and retract; and, (5) a Brace Unit (1540) comprising a plurality of means to increase structural bracing and stability.
- The proximal end of each Unit (excepting the Brace Unit) is affixed with a Plug (1130), while the distal end is affixed with a Socket (1131) to enable passing of Bus Resources between Units and/or Modules via the Bus.

One embodiment of a combination of Shoulder and Articulation Modules is shown in FIG. 4A and where Shoulder Module (1400) can be configured to several modular Units, and where these Units have a standard means of inter-connection as to provide a wide range of configuration versatility, and in this view includes the Extensible Arm Unit (1500) and the Wrist Unit (1520) and to which is affixed a Track Tool (350). As shown in FIG. 4B, the Extensible Arm Unit (1500) includes a powered extension and retraction capability. As shown in FIG. 4C, the Wrist Unit (1520) includes a powered multi-axial articulation capability.

The Hand Module (1610) functions as an integration platform between the SROV and Tools used by the SROV. The proximal end of the Hand Module is fitted with a Plug to pass Bus Resources into an MCU and an Auxiliary Socket located in the Hand Module Frame. The distal end of the Hand Module is conformed into a mounting plate (1620), to stably and robustly affix it to an associated Tool. Incorporated into the mounting plate is a Socket featuring additional power conductors to distribute a plurality of channels of power under the control of the MCU, for utilization by the Tool. A Developer Kit, preferably operable upon a personal computer, facilitates integration of a specific Tool into the Hand Module. Developers can to easily and seamlessly integrate third party tools into SROV operation by defining tool specifications, physical characteristics and SROV reciprocal requirements or constraints so they may be stored in the Hand Module MCU in a standard format. Tool functionality can be mapped in terms of signals, commands, or other command, control, and sensor language elements so that, from the perspective of the MMCU and the CCU, or other modules, signals to and from a Hand Module use the same interface as any other module. Mechanically, Tool developers need be concerned only with providing mechanical connection to the Hand Module Socket, creating distribution of power into the appropriate number of controllable channels, and connecting signal conductors from the Tool to the communication portion of the Bus. If analog controls or signals are necessary in the Tool, analog-to-digital or digital-to-analog conversion is the responsibility of the Tool provider. This easy, standardized and pre-packaged access to power and communication, in combination with a CCU Developer Programming Interface, enables field engineers to quickly adapt existing or new generation tools into the SROV system.

The following types of Tools are disclosed for purposes of the Preferred Embodiment:

A Tractor Tool (350), to provide a means for "crawler" type controllable propulsion. A Male Tool Mounting Plate is attached to the top of the Tractor Frame. Internal to the frame is a Rotary Joint Assembly that drives a geared Tractor Drive Wheel Assembly. A set of Dual Tracks, are fitted to the drive wheels to assure a high degree of traction, and the ability to navigating misaligned surfaces. In the preferred embodiment, a Tractor Tool comprises of a set of hydraulically powered, track-encircled wheels for engaging a multiplicity of surface types and angles, and thereby providing a high degree of traction, and ability to navigate misaligned surfaces.

The Thruster Tool, (not shown) provides means for "swimming" type propulsion. It consists of a mounting plate, and frame containing a Rotary Joint Assembly that is used to power an impellor and that is enclosed within a cylindrical cage.

Figure 16:
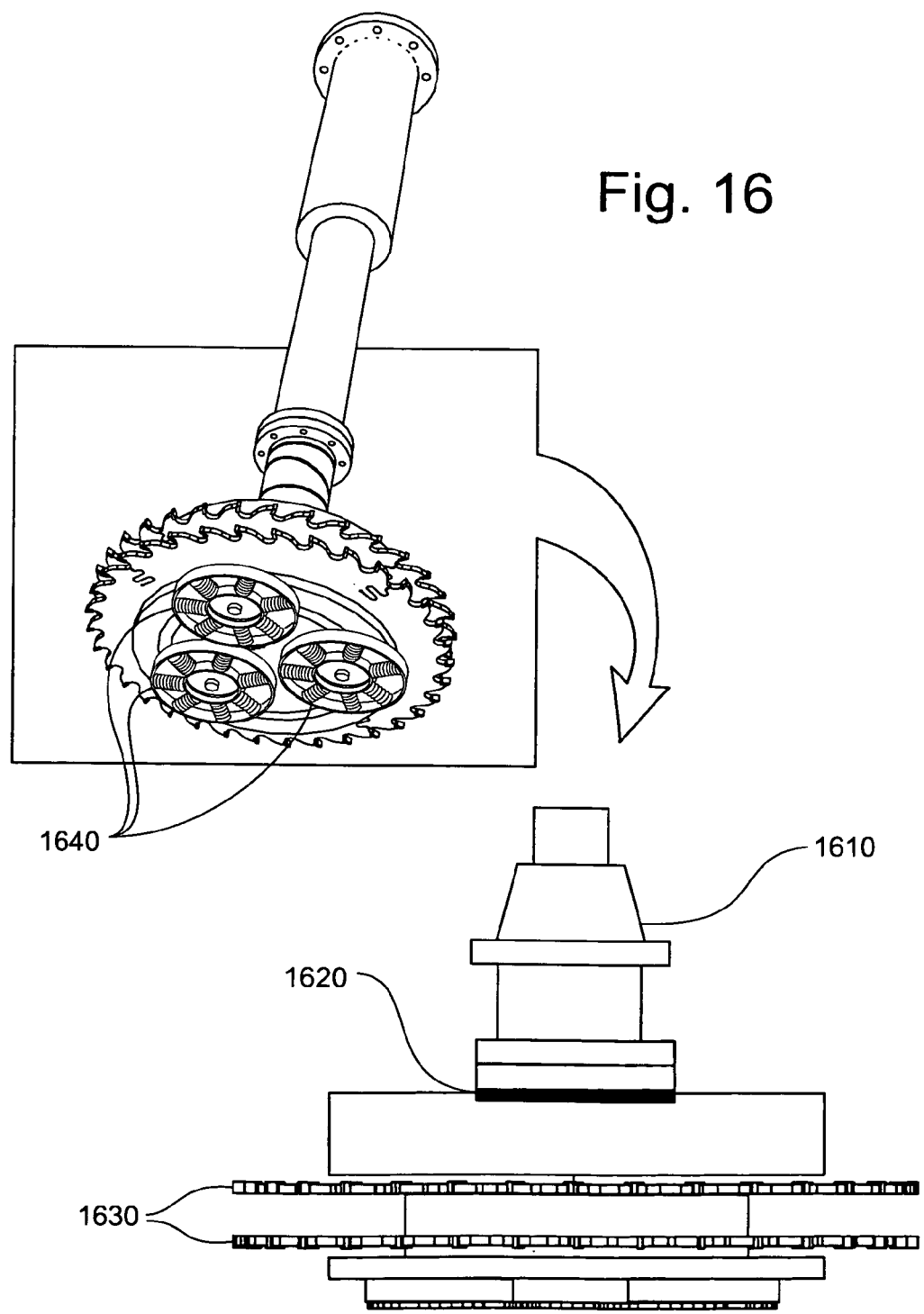
FIG. 16 is a perspective view and a side view of a debris removal tool.

The Debris Removal Tool (FIG. 16) provides a means to controllably remove high volumes of material from a surface. A Hand Module, (1610) is attached via its Mounting Plate (1620). A Rough Cut Unit (1630) (i.e., any tool capable of cutting, ripping, chipping, tearing, or digging away debris down to a uniform stubble), in this embodiment, consists of a pair of closely spaced, counter-rotating, carbide toothed, circular blades, and where the counter-rotation of dual blades offsets the transfer of potentially damaging moments of inertia, should the blades encounter difficult debris conditions. A Fine Cut Unit (1640) (i.e., any tool able to remove the stubble and/or polish the surface), in this embodiment, consists of a plurality of shafts featuring a spring loaded shaft insert (providing conformance to minor work surface variations). The distal end of said shaft insert is threaded in order to accept industry standard cutting brushing, and polishing implements so as to enable selection from numerous alternatives and deliver best practice restoration of work surface conditions. For illustrative example, spur polishers are shown in the figure.

Figure 17:
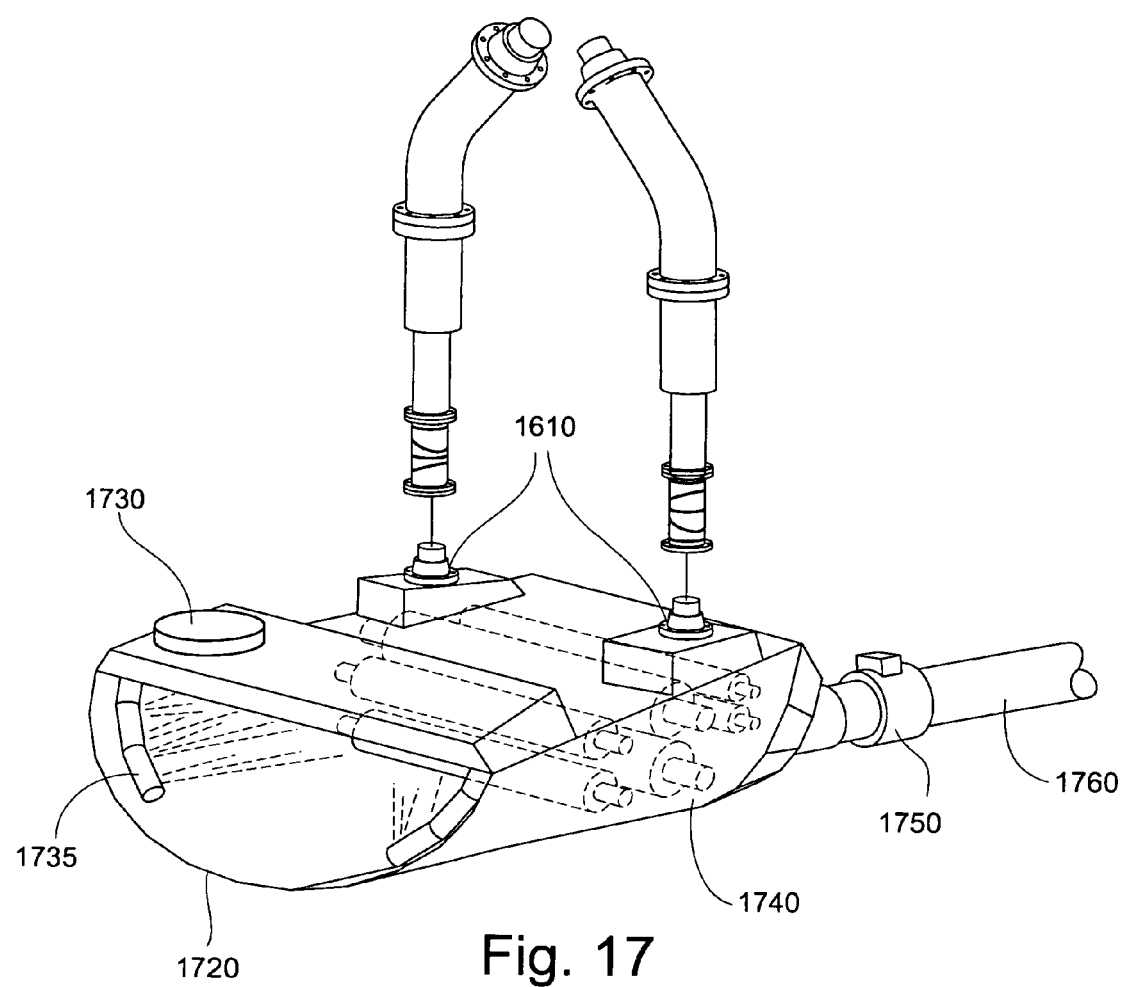
FIG. 17 is a perspective view of a debris recovery tool.

The SROV Debris Recovery Tool (FIG. 17) provides means to controllably recover debris in an environmentally responsible and regulatory compliant manner. A pair of Hand Modules (1610) is attached to each side of the Debris Recovery Frame. The Hopper Mouth (1720) is preferably adjustable (e.g., via adjustable side skirts that conform to the surface or via a hydraulically inflatable and conformable wire mesh) and that conform to surface of conduit. Water Jets (1735), located in the Hopper Mouth, are powered by a pump (1730), and direct debris back into the Crushing Mill (1740). An acquisition upper and lower roller pair features interlocking tine shaped teeth that engages the debris and reduces it to a uniform smaller sized chunks. A second roller pair reduces debris into a small particulate, while a final set reduces debris into a slurry. The rear of the hopper contains an Ejection Pump (1750) (e.g., a trash pump or other pumping means), which moves debris through the debris line. A set of variable size collets support differing diameter of debris line hose (1760).

Figure 6:
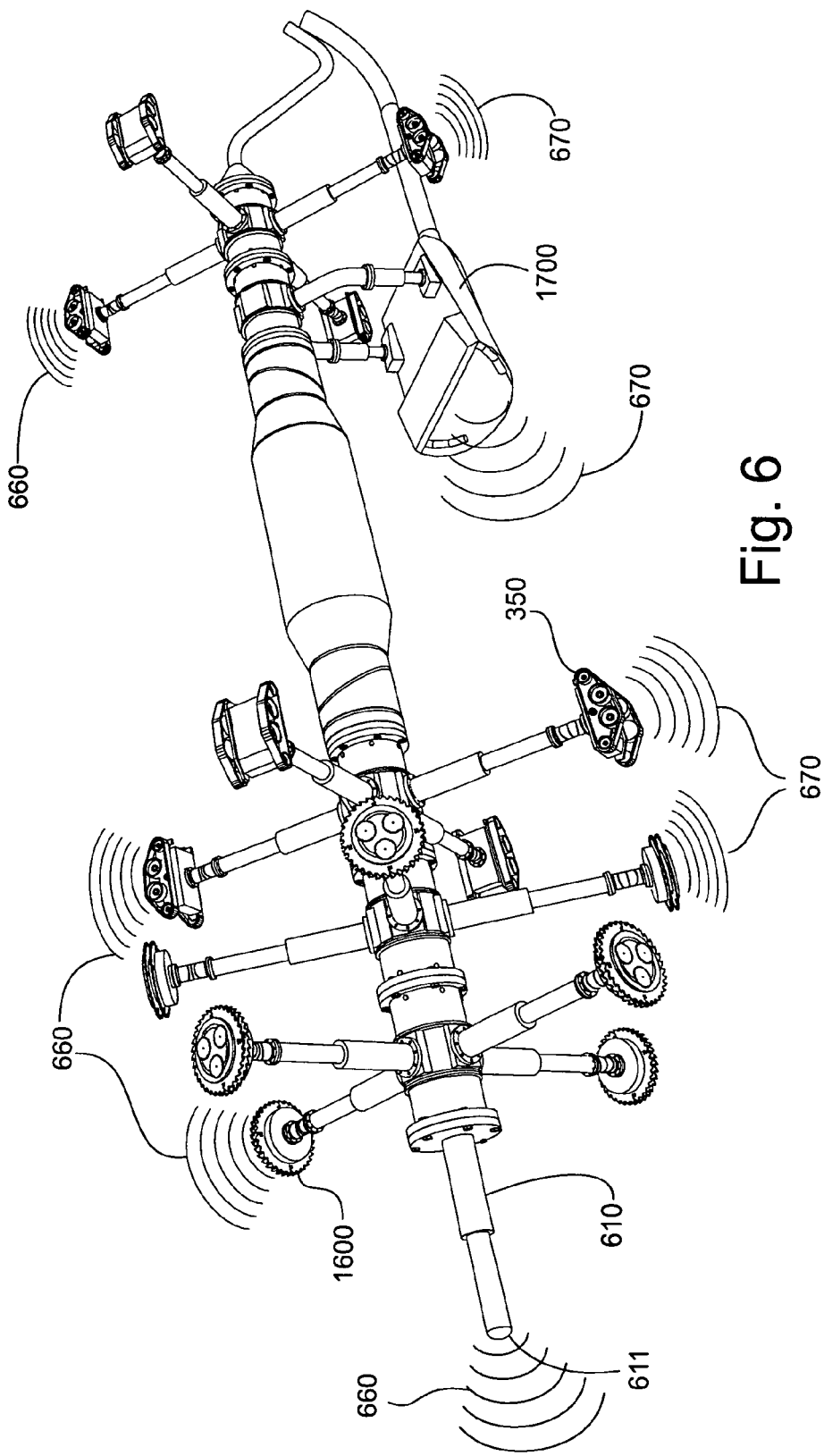
FIG. 6 is a perspective view of an SROV according to the invention with sensor-based inspection capability.
Figure 7:
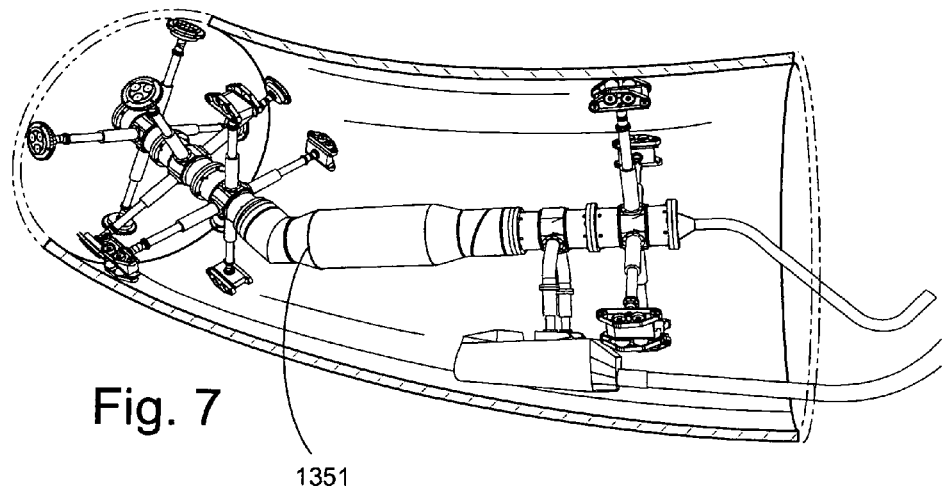
FIG. 7 is a side view of the SROV while autonomously navigating a curved upslope.
Figure 8:
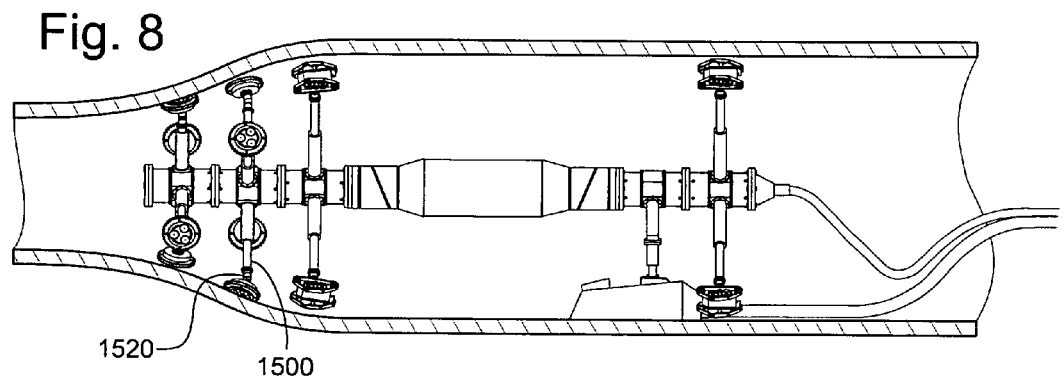
FIG. 8 is a side view of the SROV autonomously navigating a narrowing conduit.
Figure 9:
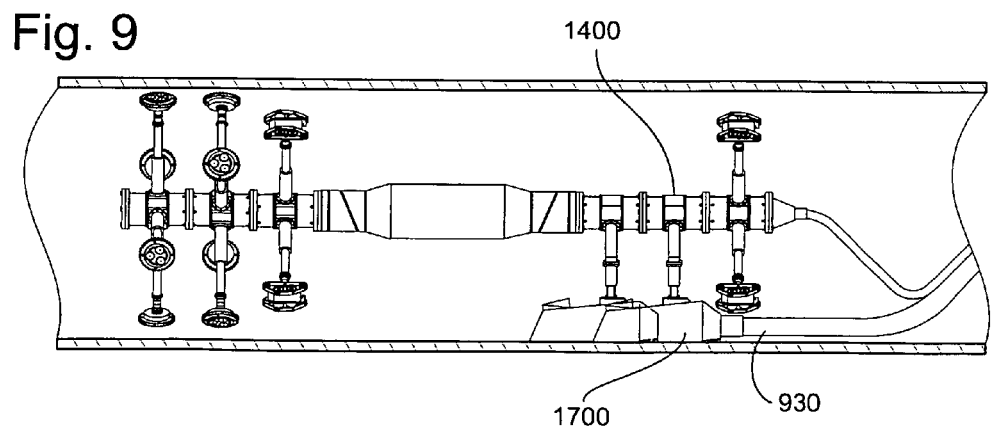
FIG. 9 is a side view of the SROV operating with an additional debris recovery module.

The SROV Inspection Tool (FIG. 6) comprises a variety of sensor hardware (611) and enables flexibility in mounting location (e.g., an extensible probe (610) projected in front of or behind the SROV), and interfaces to the Bus via the MCU in the Hand Module. One configuration may use a mounting plate onto a Hand Module for resource and attachment. Another configuration may use an Auxiliary Socket as resource and mechanical attachment. An alternative may include the use of an Umbilical Bus to allow remote positioning of the enclosure and attachment by means of a clamp. Multiple inspection and sensing modalities are enabled so as to reduce reliance upon visual devices (e.g., remote camera monitored by a remote operator) or human vision. Inspection activities may include real-time before and after sensing of work process performance, resultant surface finish and sub-surface structural condition, or the environment mapping to support navigation, orientation, and positioning. Signals from these sensors are transferred to the surface via the Umbilical, where they may be further analyzed and recorded by the CCU. Inspection sensors may be incorporated into SROV tools such as the Debris Removal Tool (1600), Track Tool (350), or Debris Recovery Tool (1700). Signals are selectively transferred to the surface via the communication portion of the Bus and the Umbilical, where they may be further analyzed and recorded by the CCU. Types of sensors well-known in the art and easily adapted for use in the Inspection Tool or elsewhere in the SROV include, for example, video, infrared, ultra sonic, sonar imaging, and eddy-current. Other types of sensors will be readily apparent to those of ordinary skill in the art.

Sensors can also be used for external examination of the SROV, MP, and connections for 'self-check', removing a major problem with many ROV and automated operations when the problem arises from the device, not the environment or operations. Types of sensors well-known in the art and easily adapted for use in the Inspection Tool or elsewhere in the SROV include, for example, video, infrared, ultra sonic, sonar imaging, thermal, conductivity, and eddy-current. Other types of sensors will be readily apparent to those of ordinary skill in the art including, but not limited to, wired, wireless, tactile, inertial, corrosion, pH, position, ultrasonic flow, incline, pressure, voltage, current, flow, payout, tilt, gas composition, imaging, bump, debris, edge, gas composition, environmental, robot tilt, temperature, humidity, hydraulic pressure, pneumatic air pressure, gamma ray, neutron, electrical, acoustic, location, accelerometric, haptic, particulate assessment, multiple-sensor arrays, and so-called Lab-on-a-Chip (including those for genetic or DNA analysis). Sensors may be integrated using analog-to-digital or digital-to-analog converters as necessary.

Functional programming for tool-specific operation is encapsulated with each hand module; sensory records and reports can be thus used to iteratively adapt and improve the SROV with a succession of better-designed Hand modules specific to the localized needs, without requiring the entire SROV to be recalled and redesigned.

Other types of Tools will be readily apparent to those skilled in the art such as, but not limited to, tools for grasping; clamping; object manipulating; object handling; pipe cleaning; barrel cutting; lateral cutting; rotating rasp; root cutting; pipe cleaning; lateral trimming; high pressure jet; pipe joint sealing; pipe joint testing; pipe profiling; pipe sampling; drilling, pipe installation, pipe sealing, and internal repair.

Modular SROV Configurations

Figure 10A:
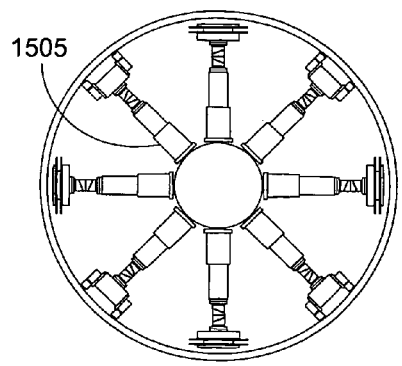
FIG. 10A is a front side view of the SROV in a narrow, circular-cross section conduit.
Figure 10B:
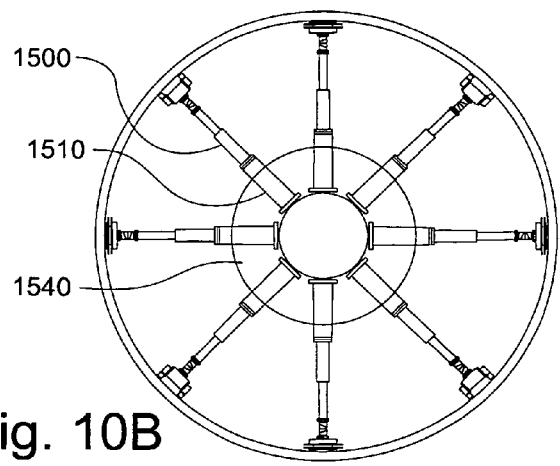
FIG. 10B is a front side view of the SROV in a wide, circular-cross section conduit.
Figure 10C:
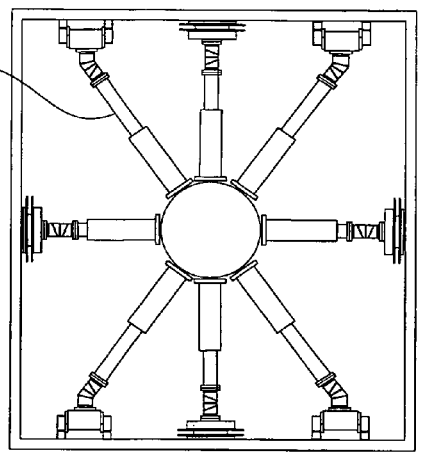
FIG. 10C is a front side view of the SROV in a rectangular-cross section conduit.
Figure 10D:
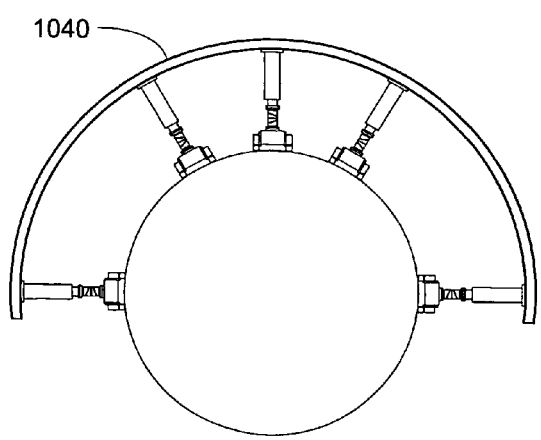
FIG. 10D is a front side view of the SROV operating around a circular-cross section conduit.
Figure 10E:
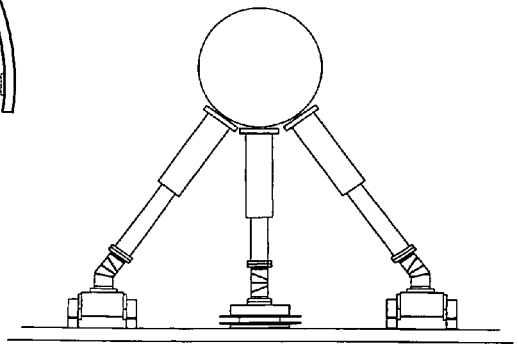
FIG. 10E is a front side view of the SROV working on a flat surface.

Standardized connections between modules and the ability of control units within modules to be interconnected (both mechanically and with respect to Bus Resources) enable modules to communicate and identify themselves to other control units. Aggregate configuration, monitoring, control, and functionality of an SROV resulting from interconnection are made known to both the MMCU and the CCU without mechanical or software re-engineering. The modules described herein may be interconnected with "plug-and-play" simplicity to provide the SROV with the functionality necessary for a wide range of work processes and environments. Field operations personnel can easily configure SROV modules (see, for example, FIG. 3) and in support of an unlimited array of work processes, environments, and achieving the automated remediation for any of the following:

- The configuration (FIG. 10A) to function in a small conduit, where a shortened Extensible Arm Unit (1505) is utilized.
- The configuration (FIG. 10B) to function in a very large conduit, where a Full Size Extensible Arm Unit (1500) is used in conjunction with Fixed Arm Unit (1510), and supported by a Brace Unit (1540).
- The configuration (FIG. 10C) to function in a rectangular conduit and where additional Shoulder Modules are utilized and where each only has a pair of opposing Extensible Arm Units (1500) and where the Shoulder Modules operate in a reciprocal fashion as the Arm Units extend and retract, and the Wrist Units articulate in order to conform to the work surface.
- The configuration (FIG. 10D) to function on an exterior surface (e.g. conduit exterior) and where the Frame Module is not a "spine" but a wrap around "exo-skeleton" (1040) and where the Track Tool may incorporate additional special purpose attachment equipment (e.g., electromagnetic attachment, grappling arms, vortex generators, or clamps).
- The configuration (FIG. 10E) to function on a flat surface.

Control System Hardware and Operating Environment

Figure 20:
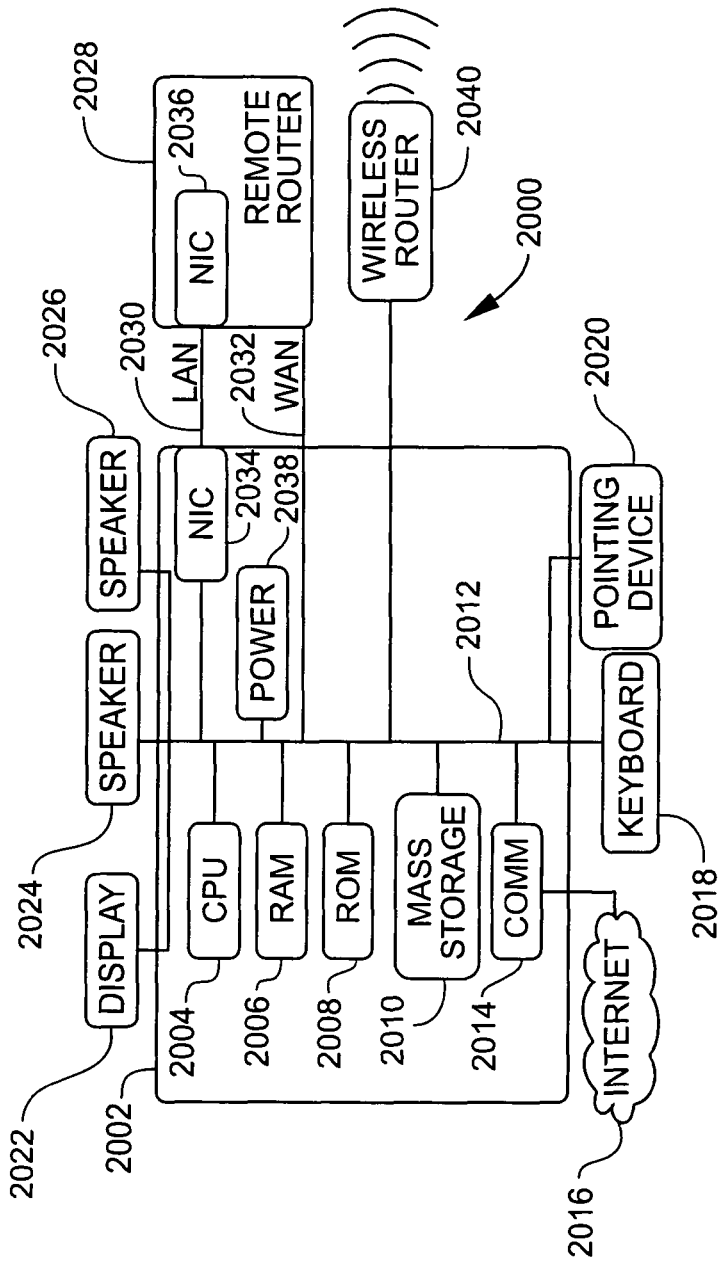
FIG. 20 is a block diagram showing a distributed and networked computer system upon which the distributed control system may be deployed.

The SROV control system hardware and operating environment functionality is described herein in terms of a computer executing computer-executable instructions. FIG. 20 illustrates one control system hardware and operating environment (2000) in conjunction with which some embodiments of the SROV and its supporting equipment is implemented. Some embodiments of the control system can be implemented entirely in computer hardware with the computer-executable instructions implemented in read-only memory, some entirely in software, and some in a combination of hardware and software. Some embodiments can also be implemented in client/server computing environments where remote devices that perform tasks are linked through a communications network. Program modules can be located in both local and remote memory storage devices in a distributed computing environment. Some embodiments can also be at least partially implemented in a quantum mechanical computing and communications environment or using analog devices. Computer (2002) may include a processor (2004), commercially available from Intel, Motorola, Cyrix and others. The Computer can also include random-access memory (RAM) (2006), read-only memory (ROM) (2008), and one or more mass storage devices (2010), and a system bus (2012) that operatively couples various system components to the processing unit. The memory and mass storage devices are types of computer-accessible media. Mass storage devices are more specifically types of nonvolatile computer-accessible media and can include one or more hard disk drives, floppy disk drives, optical disk drives, and tape cartridge drives. The processor can be communicatively connected to the Internet (2014) (or any communications network) via a communication device (2016). Internet connectivity is well known within the art. In one embodiment, a communication device is a modem that responds to communication drivers to connect to the Internet via what is known in the art as a "dial-up connection." In another embodiment, a communication device is an Ethernet™ or similar hardware network card connected to a local-area network (LAN) or wireless LAN that itself is connected to the Internet via what is known in the art as a "direct connection" (e.g., T1 line, etc.). A wireless router (2040) may be interfaced to the system bus as another means to connect to the Internet.

A user enters commands and information into the computer through input devices such as a keyboard (2018) or a pointing device (2020). The keyboard permits entry of textual information into computer, as known within the art, and embodiments are not limited to any particular type of keyboard. The pointing device permits the control of the screen pointer provided by a graphical user interface (GUI) of operating systems such as versions of Microsoft Windows™. Embodiments are not limited to any particular pointing device. Such pointing devices may include mice, touch pads, trackballs, remote controls and point sticks. Other input devices (not shown) can include a microphone, joystick, game pad, gesture-recognition or expression recognition devices, or the like.

In some embodiments, computer is operatively coupled to a display device (2022). The display device can be connected to the system bus and permits the display of information, including computer, video and other information, for viewing by a user of the computer and embodiments are not limited to any particular display device. Such display devices include cathode ray tube (CRT) displays (monitors), as well as flat panel displays such as liquid crystal displays (LCD's) or image and/or text projection systems or even holographic image generation devices. In addition to a monitor, computers typically include other peripheral input/output devices such as printers (not shown). Speakers (2024) and (2026) (or other audio device) provide audio output of signals and may also be connected to the system bus. Numerous other input and output devices may be connected in various ways well known to those of skill in the computing arts.

The computer may also include an operating system (not shown) that is stored on the computer-accessible media RAM, ROM and mass storage device, and is executed by the processor. Examples of operating systems include Microsoft Windows™, Apple MacOS™, Linux™, UNIX™. Examples are not limited to any particular operating system, however, and the construction and use of such operating systems are well known within the art. Embodiments of computer are not limited to any type of computer. In varying embodiments, computer comprises a PC-compatible computer, a MacOS™-compatible computer, a Linux™-compatible computer, or a UNIX™ compatible computer. The construction and operation of such computers are well known within the art.

The computer can be operated using at least one operating system to provide a graphical user interface (GUI) including a user-controllable pointer. The computer can have at least one web browser application program executing within at least one operating system, to permit users of the computer to access an intranet, extranet or Internet world-wide web pages as addressed by Universal Resource Locator (URL) addresses. Examples of browser application programs include Modzilla FireFox™ and Microsoft Internet Explorer™

The computer can operate in a networked environment using logical connections to one or more remote computers, such as remote computer (2028). A communication device coupled to, or a part of, the computer can achieve logical connections. Embodiments are not limited to a particular type of communications device. The remote computer can be another computer, a server, a router, a network PC, a client, a peer device or other common network node. The logical connections depicted in FIG. 20 include a local-area network (LAN) (2030), wireless LAN (2024) and a wide-area network (WAN) (2032). Such networking environments are commonplace in offices, enterprise-wide computer networks, intranets, extranets and the Internet. When used in a LAN-networking environment, the computer and remote computer are connected to the local network through network interfaces or adapters (2034), which is one type of communications device. The remote computer also includes a network device (2036). When used in a conventional WAN-networking environment, the computer and remote computer communicate with a WAN through modems (not shown). The modem, which can be internal or external, is connected to the system bus. In a networked environment, program modules depicted relative to the computer, or portions thereof, can be stored in the remote computer. The computer also includes power supply (2038). Each power supply can be a battery.

Distributed Control System

Distributed control maximizes SROV autonomous operation under intelligent planning and control, while retaining the possibility of remote monitoring, override and control. Each tier of control (in this embodiment) is comprised of a computer, having at least a processing unit, I/O unit, memory, and one or more software programs.

Figure 18:
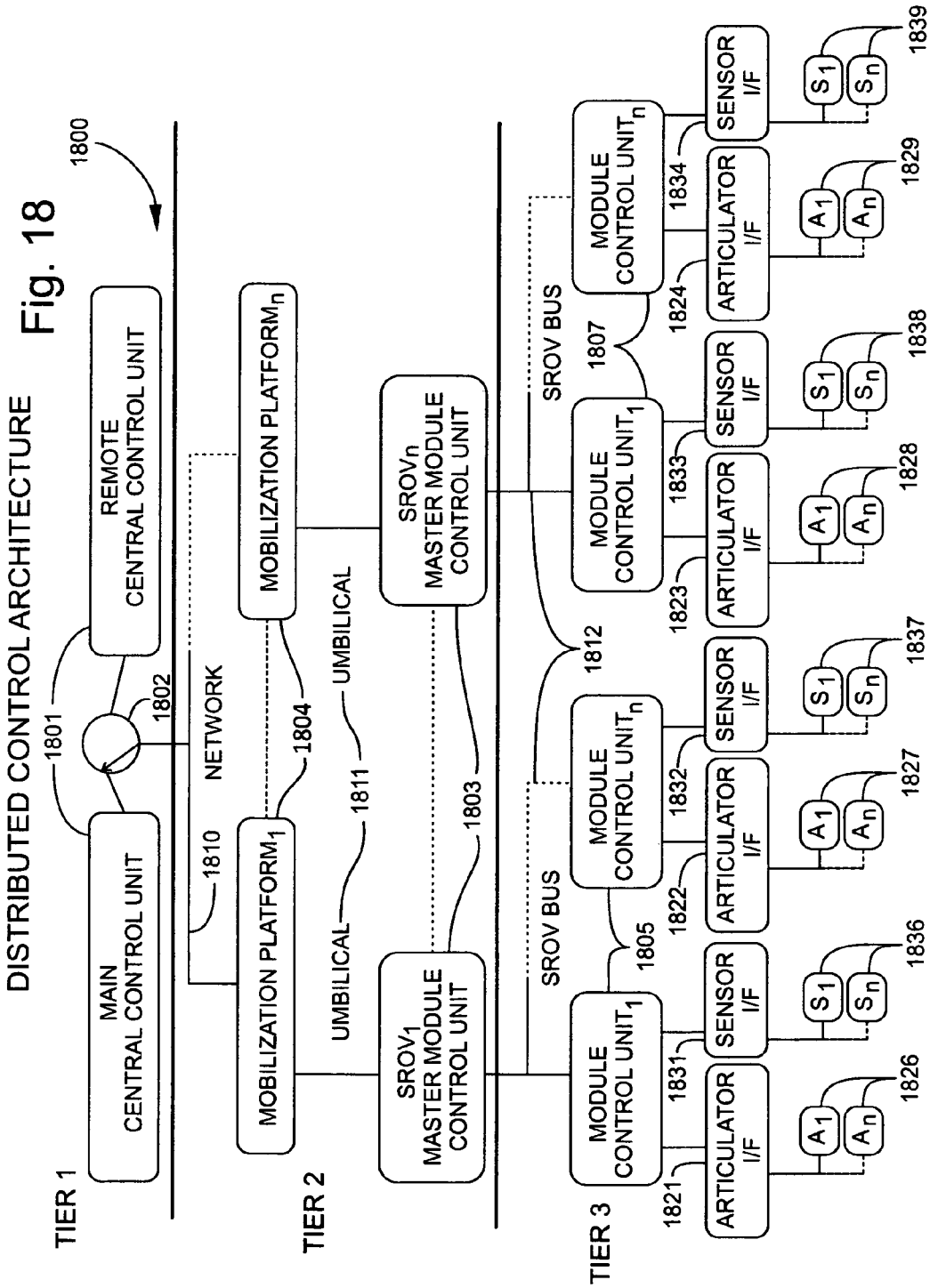
FIG. 18 is a block diagram of a distributed control system according to the invention.
Figure 19:
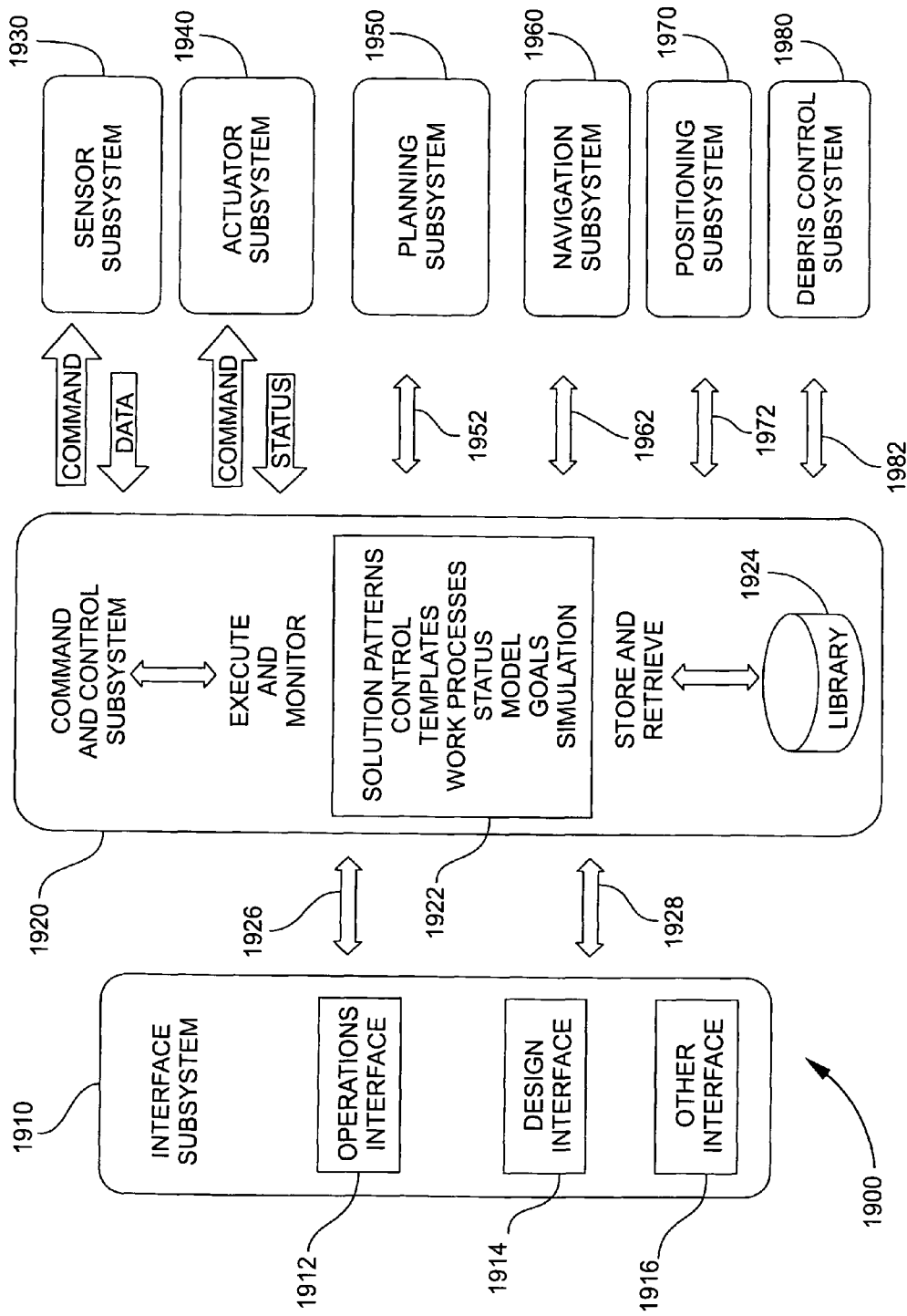
FIG. 19 shows a block diagram of functional software architecture of major software subsystems of the distributed control system and representative control flows and data flows.

The Distributed Control System (FIG. 18) is distributed across a plurality of tiers—three in the preferred embodiment (1800): (1) A CCU (1801) comprising a computer and an operator interface for remote control as well as programmed control and monitoring necessary to support autonomous robotic operation, and connection to the Frame Module via Umbilical; (2) A MMCU (1803) for the overall control of the SROV; and, (3) A MCU (1805) for the internal control of each module within the SROV, including autonomic operation;

The first tier implements computerized control and monitoring of the entire system (including possibly multiple SROV deployments) from planning through operation and SROV retrieval. The CCU is used to develop and download SROV work plans (i.e., high level programs or scripts) to implement, for example, the remediation of a specific submerged infrastructure. During SROV operation, the CCU comprises at least one operator interface to externally control the SROV via signals (both manual and programmatic fly-by-wire) and for receiving and processing monitoring signals from the SROV. The CCU may include a remote computer that can be accessed via switch (1802). The first tier communicates and is interconnected with the second tier.

The second tier implements control at the SROV level. As some implementations call for additional an SROV (1807), a separate MP (1804) is associated with each SROV being deployed. A network (1810) connects the CCU to the MP. The MP contains an Umbilical (1811) that connects the network to the SROV and, in particular, the MMCU. Within each SROV (typically in the Frame Module) resides a MMCU which detects, records and registers the SROV configuration (i.e., which modules have connected to the Bus, where, and their functionality); monitors and coordinates the movements of the various modules of the SROV; controls power conditioning and distribution; manages signal distribution; and monitors SROV parameters (e.g., position, travel, routing through the conduit, etc.); and navigates the SROV. The MMCU is responsible, for example, for preventing module movements from colliding with each other (e.g., by constraining their movements to mutually exclusive regions), for controlling their rates of performance relative to each other, and similar coordinating functions. The second tier also communicates and is interconnected with the third tier.

The third tier implements control at the module level of the SROV. Within each SROV module resides the SROV Bus (1812) that passes Resources to each module of the SROV. Within each module resides an MCU (1805) providing embedded intelligence. Each MCU is connected to a Sensor Interface (1831 and 1832) to monitor sensors (1836 and 1837). In the case of an additional SROV, an additional Sensor Interface (1833 and 1834) monitors sensors (1838 and 1839). Each MCU aggregates, formats, and uploads sensor data to other Control Units; accepts externally provided instructions; and controls the detailed operation of the specific module responsive to externally provided or pre-programmed instructions. It also manages its connection (via the Bus) to the network.

Each MCU is also connected to an Articulator Interface (1821 and 1822) to operate actuators (1826 and 1827). In the case of an additional SROV, an additional Articulator Interface (1823 and 1824) operates additional actuators (1828 and 1829). Responsive to instructions, a MCU may cause the articulated movement of a module to perform a complex movement once, to repeat a pattern of movements, or to perform obstacle detection, obstacle avoidance, or obstacle following independent of what other modules are doing.

Information about a submerged infrastructure may be loaded into the CCU and used to develop the set of instructions that will implement a desired Work Plan or process. For example, the physical layout and geometry of the submerged infrastructure may be captured using blueprints or their electronic equivalent, and inspection data used to identify obstacles, irregularities, fouling, and obstructions. From this information, simulation facilities are used to develop the SROV configuration requirements and a work plan. A work plan will typically include a path for navigation of the infrastructure, and commands for configured modules as the SROV transits the path. The work plan is then converted into a program to be downloaded from the CCU to the MMCU that is located in the SROV.

The CCU is used to develop and maintain a library of Solution Patterns. Each Solution Pattern is a set of instructions (as embodied in, for example and without limitation, an interpretable script, compilable source code, subprogram, precompiled program module, DLL, firmware, etc.) for the SROV or any control unit corresponding to a specific work requirement and/or SROV configuration. Typically, a Solution Pattern will specify a particular behavior of the configuration (such as a pattern of one or more senses and responses implemented via sensors and actuators). A Solution Pattern may be used to effect the coordination or synchronization of multiple modules. For example, one Solution Pattern, having a specific SROV configuration as a requirement, causes a Debris Removal Tool to remove crustaceans from a conduit having a round geometry, with the diameter of the conduit as a function of SROV radial extension and length of SROV travel being a deployment parameter. The Solution Pattern may incorporate obstacle (or other deviation) detection and automatic obstacle following so that the Debris Removal Tool independently removes crustaceans around the obstruction without colliding with it. Other Solution Patterns address, for example, autonomous navigation, autonomous inspection, autonomous remediation, monitoring requirements, detecting and working around types of obstacles or irregularities, autonomous pre-remediation and post-remediation inspection, and so on. Solution Patterns may be combined, possibly with custom programming or live operator instructions, to form a complete work plan as needed to accomplish a particular remediation.

Solution Patterns can be linked to the specific tool or combination of tools, sensors, and SROV design for the goal(s) that the SROV's operator, user, or customer wishes to effect. Because of the modular software and physical architecture, designers can focus on the specifics of each Tool unit they wish to provide; or SROV users can put out for bid and design their needs for upcoming or experienced taskings.

During operation, the CCU coordinates the SROV and non-SROV subsystems (including the MP). The operator interface of the CCU preferably incorporates a virtual, three-dimensional portrayal of the work area, the SROV as configured, and activities of the SROV, combining pre-loaded submerged infrastructure data with sensor data from the SROV during operation. For example, a previously acquired and loaded visual image of the work area may be overlaid with schematics, plots, and identification of obstacles, deviations, or other data. This data may be acquired, for example, by separate inspection or by the SROV during operation. Optionally, a representation or image (e.g., previously recorded, acquired from a camera, simulated, etc.) of the SROV may be incorporated to show its position, orientation, and movements with respect to the work area. Preferably, the operator may change perspectives and viewing angles, zoom in and out, directly test the operating conditions using a 'haptic' interface to verify the feasibility and/or safety of a Tool's operation, and control other viewing or display options so as to optimize monitoring, interaction, and control. This method eliminates the "operator blindness" endemic in prior art. When an operator must rely on remote cameras, productivity diminishes as turbidity and debris cloud the work environment. The SROV simultaneously provides the operator with an accurate remote visual experience of the operation, enhanced by various simulated views of SROV position and orientation, and direct measures of work progress. Monitoring of SROV internal status via sensors (limited self-awareness') permits comparison to the planned goals of the current tasking, enabling adaptive response to changed conditions whether of infrastructure or SROV.

During operation, the CCU records Operator Instructions (Sensor Data (both from the SROV and from the MP), and correlates it with the Solution Patterns being used. Performance, unanticipated events, and errors are analyzed in real-time and corrective actions taken, either autonomously or under operator control. In addition, using accumulated data about the effectiveness of a particular Solution Pattern and comparison of Solution Patterns, Solution Patterns are optimized for performance (e.g., by selecting those movements that remove a particular type of debris the fastest), made more robust and flexible (e.g., by providing multiple, alternative Solution Patterns), made more autonomous (e.g., by preprogramming a broader range of actions responsive to detectable sensor data patterns), and become responsive to unforeseen conditions (e.g., having a Solution Pattern for working around a protruding but previously undetected pipe). The linkage of internal modular sensory and status information prevents the futility of attempting work beyond the capacity of the Tool and SROV on site which has been damaged or when in an environment beyond its safe limits. Methods well known to those versed in the art of expert systems (for example, rule based or neural net systems) are applied so that the CCU (and therefore the SROV) can learn about its environment and adapt during operation. This technology is particularly well suited to improving SROV navigation using methods well known in the art for obstacle detection, obstacle avoidance, and path planning.

The MMCU receives SROV configuration requirements from the CCU. It then senses and compares the current configuration of modules to the required configuration, providing feedback to the CCU in case of discrepancies. Preferably, the MCU continuously integrates and compares the internal model of the SROV system and its environment against the experienced and perceived current state of both the operating environment and its physical status and capacity. This is particularly useful in the event of a module failure (e.g., loss of module connection or function), and enables adjustments and compensation for the loss, or extraction and repair.

The MMCU also downloads Control Templates from the CCU and distributes them to the intended MCUs (optionally as firmware upgrades). Control Templates provide instructions for translating high-level operational command strings into a correlated set of low-level command streams targeted to a specific module, and for translating between internal signals from a sensor to a data format for inter-module communication and for communication to the remote control means (e.g., CCU). For example, it may be implemented as a software translation table having means for parameter substitution, and downloadable to a Control Unit as firmware. This enables the CCU to reprogram modules or to expand and alter the set of high-level commands to which the SROV and its modules can respond. The same Control Template is used by the MMCU to associate and aggregate sensor data with high-level commands, and upload a more coherent status to the CCU. Control Templates are also used by the MMCU to translate commands and sensor data between modules for purposes of synchronization and coordination during operation. This provides the flexibility for the MP or OC level of control—the 'human operator'—to determine whether it will be better to run multiple passes, or to begin at one while simultaneously sending down multiple task-special units to allow, post-modification, multiple-Tool applications on a single pass—with appropriate 'corrections' for the just-affected target.

The MCU accepts low-level commands from the MMCU via the SROV Bus and decodes those commands into Peripheral Control Signals that govern actuators (e.g., electrical solenoids, fluid control valves for the operation of Joint Assemblies, etc.). The MCU (1805) aggregates current real-world status data (returned by sensors (e.g., joint assembly, motion, positioning, and inspection sensors), compares this against current functions and goals within its operative hierarchy, and uploads this Combined Status back to the MMCU.

The SROV Distributed Control Architecture (FIG. 18) implements computerized and integrated command and control of the SROV. This architecture comprises Physical Interfaces for operator input and output, sensors, and actuators. Each physical sensor and actuator is connected to the communication portion of the Bus (preferably via a MCU), which provides network interconnection for the system. Analog sensors and actuators preferably incorporate analog-to-digital converters for output (data) and digital-to-analog converters for input (control) so that all data is in a Common Digital Bus Format accessible to the software system. In addition to providing measurement and monitoring signals as output, some sensors may be controllable and accept input signals to control any of, for example, on and off status, positioning, resolution, data rate, and so on. Similarly, in addition to accepting input signals for control purposes, some actuators may provide status, measurement and monitoring signals. All of these Signals are shared between system components via the communication portion of the SROV Bus.

Higher tiers may override any preprogrammed or otherwise automated response of a lower tier. Lower tiers signal higher tiers when that tier is sensing a problem such as out-of-limit resistance to movement, functional failure, and so on. In appropriate circumstances, a first MCU may send messages directly to a second MCU as, for example, to more rapidly avoid local collisions. This cross-tier, closed loop control and sensing system maximizes opportunities for response, adaptability, and autonomy.

The SROV Control Architecture's tiered hierarchy enables 'real-time' operation for the SROV and any subordinate grouping of its modules. It should be noted here that the use of the term "real-time" within this application does not denote either instantaneous time or the minimal time for computer processing of a control determination. The concept of what constitutes "real-time" SROV operation depends upon number of different factors, including the given application, the time constraints for that application, and the internal and external conditions. For example, an asynchronous communication link could be considered 'real-time' if the packets are exchanged on a very high-speed network, if the response must engage the reading, comprehension, and reaction of a human at one end, even though the individual packets may be transmitted (and even lost and retransmitted) in microseconds.

Accordingly "real-time" must incorporate the boundaries of operative and communicative delays imposed by competing signal needs for the Bus; normal, current, and extraordinary signal density relating to operation of the SROV and module(s); the distance between sender and receiver (doubled for higher-level feedback or override control commands), and like real-world factors. Remote operation, whether by human 'telepresence', wireless radio signaling from a remote mainframe, or any mixture of human and off-location computer guidance, will also be limited to the transmission speed and information capacity of the Bus. If the motion of the SROV is measured in centimeters per second, a half-second delay in transmission around the half the globe to a centralized human command center may well be a meaningful delay when edging up to a hazard; alternatively, the entire operation of placing a seal on a pipeline leak may be considered a 'real-time' effort.

In this application, 'real-time' refers to the totality of a sensor-response feedback loop in the physical world as opposed to an internalized model or partially-enacted hardware effort, or an attempt that has no real-world effect on the intended goal unless and until transformed into the final and completed operation. The degree to which an application is "real time" is largely a measure of the speed with which the application can detect (i.e., perceive, sense or compute) a situation and react appropriately (e.g., providing the information to a user, automatically correcting a detected problem, or otherwise responding).

Software Functional Architecture

The functional software architecture (1900) of the SROV comprises at least the following programmable subsystems, each encapsulatable in the preferred embodiment so as to minimize control-and-status and/or feedback signaling load on the Bus:

Command and Control Subsystem—The Command and Control Subsystem (1920) is the main subsystem that coordinates process and data flow among the other subsystems, however distributed. Responsive to signals from the Interface Subsystem (1926 and 1928), it invokes the functions (1922) required for any design, simulation, and operation task. Other functions include storage and retrieval (e.g., infrastructure specifications, work processes, Solution Patterns, configurations, sensor data, histories, etc.), system functions (e.g., startup, shutdown, backup, recovery), system health check and monitoring, automated system failover and recovery, download (e.g., configurations, Solution Patterns, Control Templates), upload (e.g., status, configuration, sensor data), and emergency SROV recovery procedures. Configurations include computer readable descriptions of modules, sensors, actuators, and software reflective of a particular SROV configuration. Optionally, the Command and Control Subsystem maintains a complete record or "history" of every design, simulation, and operation task that is performed on the system. These histories are used for, for example, additional simulations, new work process or Solution Pattern design, optimizations, and auditing purposes and is stored in the Library (1924).

Interface Subsystem—The Interface Subsystem (1910) manages and drives all operator interfaces, including at least one interface (1912) for operators to interact with the software system, including output (e.g., video display, audio, optics, speech generation, haptics, etc.) and input (e.g., mouse and keyboard, touch, voice recognition, accelerometric, pressure, etc.). Types of interaction include design (1914) (including specification of infrastructure and its state, work process, Solution Patterns, and Templates), simulation, operation and may require other (1916) types of interface. During operation, the Interface Subsystem combines data from, for example, the Sensor Subsystem, the Intelligent Planning Subsystem, and the Navigation Subsystem to provide real-time display of the SROV and its environment. Images (e.g., visual, sonar, ultrasonic, thermal, etc.) from sensors or previously recorded still images may be overlaid with blueprints, schematics, computer generated images or renderings (e.g., of fouling, debris, or obstacles), and supplemented with other sensor data. The Interface Subsystem also communicates with the Command and Control Subsystem and Sensor Subsystem, to allow the display of the difference between planned, current, and past conditions, thus allowing progress of any task to be more accurately determined. During simulation, these same facilities are used without need to physically deploy the SROV to simulate a work process or task, using sensor data that is either computer generated or pre-recorded. This simulation allows 'failure simulations' to test operators' and system capacities to deal with the unanticipated, and usually unwanted, differences between model and goal.

Sensor Subsystem—The Sensor Subsystem (1930) manages all software specific to physical sensors. It detects and registers (as part of the SROV configuration) sensors that are connected, receives and forwards commands to sensors, receives data signals from sensors, performs sensor health checks, maintains a history of data, commands, and status in storage; aggregates and formats data and status, and sends data and status to other subsystems.

Actuator Subsystem—The Actuator Subsystem (1940) manages all software specific to physical actuators, thereby controlling the relative positions and movements of the SROV modules relative to the Frame Module. It detects and registers (as part of the SROV configuration) actuators that are connected, receives and forwards commands to actuators, receives data signals from actuators, performs actuator health checks, maintains a history of data, commands, and status in storage, aggregates and formats data and status, and sends data and status to other subsystems.

Planning Subsystem—The Planning Subsystem (1950) receives sensor data and status, detects obstacles and other deviations from anticipated surface and infrastructure conditions (using, for example, maps, obstacle detection, and obstacle avoidance methods well-known to in the arts pertaining to robotics), develops plans (i.e., positioning and orientation commands necessary to negotiate the deviation and achieve the navigation goal using methods well-known to in the arts pertaining to robotics), and sends (1952) plans and information describing detected deviations to other subsystems. From a record of the insertion and transit of the SROV and its current position, the Planning Subsystem may compute an exit path and commands to implement the exit path.

Navigation Subsystem—The Navigation Subsystem (1960) receives signals and data relevant to SROV position and orientation, interprets those signals, determines SROV position and orientation, and forwards this information (1962) to other subsystems.

Positioning Subsystem—The Positioning Subsystem (1970) controls SROV position and orientation. It accepts SROV position and orientation signals, commands pertaining to SROV position and orientation, and generates and sends commands (1972) to the Actuator Subsystem to modify position and orientation by actuating the SROV Propulsion Subsystem.

Debris Control Subsystem—The Debris Control Subsystem (1980) manages all software pertaining to physical debris, including removal, recovery, and reclamation. It receives signals pertaining to SROV position and orientation, debris removal rate (e.g., from sensors in a Debris Removal Tool), and debris recovery rate (e.g., from Debris Recovery Tool or sensors measuring turbidity), and coordinates (1982) the rates of SROV transit, debris removal, debris recovery (e.g., to maintain uniform remediation, avoid infrastructure abrasion, removal system clogging, jamming, etc.), dredge pumping, and debris reclamation.

Each of these functional subsystems may be implemented on one or more computer systems, and distributed in any convenient manner. Functionality may be distributed (i.e., be partitioned or replicated) in numerous ways. For example, in the preferred embodiment, these functions may be distributed across different computing tiers (e.g., CCU, MMCU, and MCUs of the preferred embodiment), across multiple SROV modules (e.g., Frame Module, Shoulder Module, Articulation Module, and Hand Module of the preferred embodiment), or some combination.

Supporting Equipment

Many functions supporting the SROV are better managed from the surface. This support is provided by the MP, situated to best manage deployment functions including those associated with the Umbilical and Debris Line. The OC manages power and communication functions.

The MP (211) manages the deployment and recovery of the SROV, the SROV Umbilical and Debris Line, and automates the synchronization of the Umbilical and Debris Line with the travel of the SROV under monitoring and control of the CCU. This includes collocating, managing, and synchronizing the travel of the Umbilical (212) and Debris Line (213) that are housed on the platform and connected to the SROV.

The Umbilical supplies both power to the SROV and communication (i.e. both sensing and control signals) between the SROV and other sub-systems. The Umbilical is environmentally protected, constructed as to maintain neutral buoyancy, resist abrasion, and re-enforced to allow its use as a retraction tether. The proximal end of the Umbilical is fitted with an Umbilical plug while the distal end is fitted with an Umbilical Socket (383). The Power Management Unit (381) features an Umbilical Plug at its proximal end in order to attach to the Umbilical Socket (383). It features a Socket and Adapter at its distal end so as to attach to the rear of the SROV. The Power Management Unit contains a Step-down Transformer, and Power Supply Components, to transform the high Umbilical transmission voltages into the proper voltages and amperage to power the SROV Bus.

The Debris Line is a flexible conduit for moving debris from the SROV up to the surface, in order to allow the transfer of debris into a Dredge Spoil Reclamation Facility. The Debris Line may be deployed in conjunction with the Umbilical or separately. In one variation of the illustrative embodiment the Debris Line is a standard dredge line. In another variation it is physically integrated with the Umbilical. The Umbilical and the Debris Line are instrumented with sensors that provide measures of payout, position, operating, and health status to at least the CCU. The MP, since it will be the principal human operational control center for a specific SROV, will have a monitoring and operational control station to monitor and control the umbilical and debris line connections and operations linking the SROV with the MP and OC. Thus the MP for each SROV will have means for extending and retrieving the umbilical; umbilical positioning means for extending and retrieving the umbilical; umbilical placement means for managing the rotational and directional position of the umbilical, or a sub-portion thereof; a debris retrieval line; debris retrieval line positioning means for extending and retrieving the debris retrieval line; debris retrieval placement means for managing the rotational and directional position of the debris retrieval line, or a sub-portion thereof; debris retrieval line operating means for activating, operating, and shutting down the debris retrieval line; means for directing the output from the debris retrieval line into a targeted deposit area or volume; and, means for monitoring the status of the umbilical, the debris retrieval line, the debris retrieval line positioning means, the debris retrieval line placement means, the debris retrieval line operating means, and the targeted deposit area or volume.

This platform is preferably constructed from a modified shipping container, allowing for easy transshipment and is a self-contained, enclosed structure. The top cover lifts away to expose the platform and the cover then serves as the facilities shed during deployment. Standard container doors provide access and the opposing end of the container features a spare parts locker that, among other things, provides for the storage of a set of floor panels. A Distribution Panel, located adjacent the locker, allows for connection of power and communication lines to OC Power and the further connection to the platform Junction Box.

The Umbilical Supply Reel Unit (214) located on the platform is used to pay out and take in the SORV Umbilical. This unit consists of a motorized base with the appropriate rotary coupler that has one side connected to the junction box, and where the other features an Umbilical Socket in order to connect with a slide on spool containing the SROV Umbilical. Multiple spools may thereby be attached together for long distance deployments. The platform has davits to support a removable cradle that houses the SROV during transshipment.

The platform may be positioned in various ways such as at the shores edge or on a floating barge. Guide Sheaves and a set of associated brackets or anchors align the travel of the Umbilical from the supply reel to the designated work area of the SROV. These Sheaves are installed in such a manner so as to allow the Umbilical to be used as a retraction towing line, in case of malfunction of the SROV. A Debris Line Station stores, inserts, or removes sections of the Debris Line, a Booster Pump that can be inserted into the debris line to increase flow volume, and transfers recovered debris into a Dredge Spoil Reclamation Facility.

The Umbilical features a replaceable outer abrasion jacket, woven from a wear-resistant material, to protect the Umbilical. Under the abrasion jacket is a layer of high-strength woven fiber to provide the structural integrity and strength to allow the Umbilical to be utilized as a towing line as to retrieve the SROV. A thermoplastic flexible core, of the proper density to provide neutral buoyancy, encapsulates all of the conductors within the Umbilical. Individual conductors include Power, Communication and Systems Ground. Typical power conductors include a Neutral Power Conductor, Ground Conductor, and a plurality of Hollow Power Conductors (typically three). The hollow portion for the insertion of Communication Conductors serves to minimize the negative impact on signal quality from the surges in the power conductors as power is adjusted or fluctuates. Communication Conductors are wrapped in an interference shield to further isolate the radio interference projected by the high voltage alternating current. The communication conductor may be a fiber optic cable fitted with its own signal shield and insulation. Alternatively in other Power Conductors, an Electrical Signal Conductor may be inserted).

The OC (230) is preferably a self-contained, enclosed structure having environmental conditioning to protect human operators and sensitive equipment. This equipment provides the ability to connect with a source of power, monitors and condition that power according to load requirements, support communications, and to control and monitor the SROV and MP. The CCU comprises both an operator interface for remote operation and means of monitoring the SROV. It further comprises means to pre-program Control Units for autonomous operation, including functions to monitor, respond to, present, display, record, and analyze signals from the SROV. The OC can be remotely located and in real-time re-located or re-directed to specialist technician, operative(s), or secure recording archive. It is constructed from a modified shipping container to simplify transshipment, and that has been partitioned into a maintenance area, an equipment area, and an operations area.

The Maintenance Room is entered through the standard container doors. The interior is fitted with a service bench, storage bins, shelves, and diamond plate floor. All materials and equipment are properly secured for container transshipment.

The Equipment Room consists of a dual bulkhead forming a room that separates the maintenance area from the operations area. A man door is located in each bulkhead forming not only access to this room, but a hallway between maintenance and operations. Located within the equipment room is a forced air conditioning system to protect human operators and sensitive equipment. A fold up service mast accepts standard industrial power (e.g., three-phase, 440 Volt), either from the grid or alternatively from an equivalent generator. The Power Control Center is located between the bulkheads, and against an outside wall. The Power Control Center transforms grid voltages, conditions and regulates resultant electric power, as well as to provide overload and ground fault protection. A fail-safe electric power lockout assures that divers are protected if they must enter the water near the SROV or its umbilical. The Power Control Center also has an interface to the control equipment located in the Operations Room as more fully described below.

The Operations Room partitions the opposite side from the bulkhead in order to enclose a lavatory, kitchenette, and bunk facilities. The operational side of this partition includes built-in closet and filing facilities. A door and windows provide access, natural light and a view of outside activities. The center of the operations area includes a conference table and chairs. An Operator's Monitoring and Operations Station and including a desk and equipment rack are built into the equipment room bulkhead. The enclosed equipment includes a Communications Unit and supporting cellular, radio, landline, or alternatively satellite communications, with associated handsets, and facsimile. A Power Monitoring Unit displays key electrical status and provides means for emergency power shutoff. The CCU has an Operator Console with display unit for presenting a depiction of the SROV in its work environment.

Other Embodiments

In an extension to the preferred embodiment, independent and specialized Helper Modules having Auxiliary Flanges may be deployed between, and connected to, sections of the Umbilical. Typically, a Helper Module will be powered, monitored (via incorporated sensors), and controlled (via actuators) via the Umbilical. A Helper Module may also incorporate any of its own MCU, independent intelligence, and power source. A Helper Module may, for example, be a pumping station used to augment pumping capacity for the Debris Line over long deployments. As another example, a Helper Module may be incorporate locomotion means (e.g., a motor) for additional power when deploying or retracting the Umbilical or towing the SROV. A Helper Module may also incorporate stabilizing means (e.g., extensible clamps to attach to a conduit wall) so as to stabilize the position of the Umbilical or Debris Line with respect to the work surface. In a further embodiment, redundant modules may be configured so that failure of a module results in failover to the standby, taking the failed module offline automatically. In a further embodiment, a Helper Module is used on detection of a failed module to deliver a replacement module and remove and return the failed module to the MP. Numerous other uses of Helper Modules will be readily apparent to those of skill in the art.

In another extension to the preferred embodiment, a Strain Relief Module is used to detect and relieve strain and stress due to, for example, friction or obstructions on a line linking the Frame Module to the MP, the Frame Module to a Helper Module, or the OC to the MP (e.g., the Umbilical or Debris Line). The Strain Relief Module is preferably an autonomous robot, having independent power, locomotion means, and on board intelligence. It is preferably attached around the line, and travels along the line via a motor driving wheels in contact with the exterior surface of the line. On board sensors enable the Strain Relief Module to monitor stress and strain in the line and to detect upcoming obstructions such as contact with a work surface (e.g., interior of a conduit wall); and to communicate the same with any or all of the other modules, MP, or OC also connecting with and through that same line. The Strain Relief Module travels to the part of the line where it is needed and then positions at least a portion of itself between the obstruction and the line, extends extensible arms to stabilize itself with respect to the work surface (e.g., via hydraulic pressure or mechanical clamps). It then disengages its wheels from the motor in such a way that they may rotate freely and so that the line is provided with relief from stress, strain, friction, abrasion, and the like. The Strain Relief Module may retract its arms, re-engage its wheels, and reverse its motor so as to return to the surface independent of the SROV. Retraction may occur in response to receipt of an external command or may be programmed for retraction on detection that the line is being retracted to the surface. Communication with the surface may be effected via (for example) wireless, sonar, or electromagnetic sensor capable of detecting a signal carried on the electrical power line).

In a further embodiment, additional modules for specialized tasks (item retrieval, item delivery, etc.) can be created and added, with the developer only having to program the lower level needed for that module's functional operation; this makes the SROV capable of expansive adaptation to infrastructure-specific tasking.

In an alternative of the preferred embodiment, the highly distributed control architecture is replaced by a more centralized architecture. In the distributed architecture, a separate module performs every major function, and that functionality is distributed across three or more tiers of control. In a more centralized architecture, functions may be compressed into fewer or even a single module, and control of functionality may be provided in a two-tier, or even a single tier of control.

In an alternative of the preferred embodiment, operating SROV functions by hydraulic power is replaced by other means. The use of electricity to drive a hydraulic pressure pump is but one means to provide power to operate SROV functions. Alternative means could include all electric, fuel cell or other new power production technologies, or any hybrid combination (e.g. electric power from the MP to the Frame Module, and from the Frame Module to the Shoulder Module, combined with hydraulic power from the Shoulder Module to a Thruster Module or a Debris Removal Tool).

In an alternative of the preferred embodiment, communication between various modules and supporting equipment by fiber optic cables is replaced by other means. Optical fiber is but one means to communicate between modules and supporting equipment. Alternative means could include electrical cables, wireless transmission, acoustic coupling, and other methods of signal communication and control. In several further embodiments, alternative responses are embedded into the MII to deal with failures of the SROV, whether from internal or external causes. These include the placement in the Frame module of a 'state record', recording device comparable to the 'black box' of a jet airliner, which retains onboard the SROV the sensory records for retrieval after a shutdown, to allow post-incident review and engineering corrections. Another alternative is the incorporation of an internal power source and a set of alternative 'recovery or retrieval' options selected by the SROV upon any failure, where the choice of automated response is principally driven by the battery state (i.e. available power). Another alternative is the incorporation into separable and self-mobile modules of detachment means and a homing beacon, enabling the slimming of an SROV's profile and dependence upon an external, perhaps wire-driven, retrieval means.

In another alternative to the preferred embodiment, any of a set of SROV self-repair or re-tasking efforts are handled by a specialized module, e.g. a delivery module that brings down thrusters and replaces all the tractors to enable free-swimming propulsion (or vice versa); or replaces chemical with nuclear sensory guides for debris removal tools; or performs an 'in-pipe' substitution and removal of an old and perhaps damaged articulator or tool module with a new and more apt replacement.

In an alternative of the preferred embodiment, the mechanical apparatus used for debris removal is replaced by other means. The utilization of mechanical cutting and polishing devices is one device to remove debris. Alternative devices may include other mechanical devices, water jets, laser beams, sonic wave transducers, compressed gases, heat, cold, or any other means for the removal of debris.

In another alternative of the preferred embodiment the mechanical apparatus used for debris removal is replaced by a conduit-filling scraping unit (or 'pig') connected to the Frame Module or MP through communications, power, and signal lines, and is driven through a portion of a conduit or pulled through a portion of a conduit by pressure differential or a prepared traction line to move debris internal to the conduit to a collection location, without losing communication and contact with the SROV, thereby ensuring continuous feedback and control reflecting current factors whether such is effected autonomously or under real-time human direction.

In an alternative of the preferred embodiment, the mechanical collection of debris in a hopper, pulverizing it in a crushing mill, and pumping it to the surface is replaced by other means. The utilization of the apparatus specified in the preferred embodiment is but one approach. Alternative means may utilize other apparatus, such as a macerator, particulate distributor, or entirely new components and configurations may be incorporated, to meet specific job requirements.

In an extension of the preferred embodiment, inspection devices and units specialized for sensing and measuring may be expanded to include traction. Propulsion achieved by tracked wheels may be replaced by other locomotion means. Other embodiments may utilize additional methods and means for determining position, including satellite or other global positioning frameworks, sonic, acoustic, laser telemetry, or any other practicable means that can provide positional data for the purposes of navigation, mapping or control.

In an extension of the preferred embodiment, other hazardous environments may require service. Alternative embodiments for hazardous service duty could include, the interiors of tanks, the holds of ships, the bottoms of settling ponds, mine shafts, tunnels, pipelines, sewers, water mains, areas of radioactivity or high voltage, areas dangerous heights above the water or land, or any other hazardous environment, where infrastructure inspection, repair or maintenance can be conducted to remove humans from exposure to harm, and to incorporate robotic efficiency to increase rates of production over manual processes.

In another embodiment, the Debris Removal Tool hopper is designed to funnel debris from the conduit by having sides that conform to a significant portion of a cross section of the conduit, and being approximately centered on the axis of the conduit. The hopper sides may be contracted and expanded as needed to address changes in the geometry or cross section of the conduit.

In an extension to the preferred embodiment, alignment of the means of locomotion (e.g., drive wheels of the Tractor Tool) with respect to the ROV frame may be changed in response to signals (e.g., by issuing commands from the operator console). In an alternative of the preferred embodiment, traction and propulsion achieved by tracked wheels or propellers is replaced by other locomotion means. Tracked wheels are but one means of securing and moving the SROV. Alternative means could utilize vortex generators, pumps, fans, suction pods, water or air jets, electrical motors, electromagnetic units, inch worm units, pneumatic units, or other developments in the field of traction and propulsion. Other means of locomotion such as, but not limited to, iris-like, flow-driven with insertion from head end of conduit, towing via tow line, umbilical, jets, electric motor, propeller, corkscrew, separate robot, Helper Module, and the like.

In yet another extension to the preferred embodiment, the Umbilical is terminated in a Docking Module to which the SROV frame connects (e.g., a Frame Module). In this case, the Plug and Socket are preferably designed for submerged quick connect. The Docking Module comprises means to attach stably to the work surface (e.g., conduit or pipe) on command, whereupon the SROV (e.g., the Frame Module) can disengage or undock from the Docking Module, perform a work process autonomously, and then return to dock with the Docking Module, for extraction, recharging, uploading data, downloading new instructions (e.g., commands, Solution Patterns, Control Templates, etc.), or moving the Docking Module or Umbilical. This capability is particularly advantageous when addressing surfaces that cannot be easily remediated by the SROV while attached to and pulling the Umbilical. When the Docking Module includes a Debris Disposal Tool, it also permits the SROV to move a distance away from the Docking Module, perform a debris removal function, and push debris back toward the Debris Disposal Tool.

Other embodiments of the SROV may capture and move debris using means other than crushing and pumping through a Debris Line, and may move debris to locations other than the surface. For example, in another embodiment, the Debris Removal Tool is augmented with means for manipulating and grasping chunks of debris that are not easily crushed, attaching a tow line to them, and towing them to another location, another module, or to the surface. In one embodiment, debris pumping means is augmented by injecting air into the Debris Line, use of an airlift, or jet hoses.

In an alternative embodiment, the functionality of the MMCU is deployed such that every module interacts with every other module on a peer-to-peer basis and shares responsibility for coordinating functions. This embodiment improves upon reliability and robustness at the cost of implemented a more complex distributed control system.

In one embodiment, sensors have sufficient intelligence and network awareness to be connected directly to the Bus and are not necessarily connected via a separate Control Unit (e.g., a MCU). In another embodiment, all sensor data is communicated between Control Units via a common digital data format and instructions are communicated between Control Units using a common command, actuator, control, and sensor language (e.g., variations and specialization of Actuator Programming Language IPL Autonomous Vehicle Control Language, Compact Control Language, GBML, GSML, OpenGIS SENSORML, XML, etc.). Preferably, actuator control and sensor data are communicated using message-passing and a light weight services-oriented runtime, such as supplied by Microsoft Robotics Developer Studio™. In a further embodiment, sensor or actuator profiles to which instruction executed by Control Units relate, including operating characteristics, operating thresholds and bounds, and the like, may be altered by, for example, loading new profiles into storage accessible by the Control Unit.

In a further embodiment the MP manages for each Umbilical and Power line a torsional tracing and current strain measurement for that line, to both measure against the operational safety/wear limits and to guide motion of the SROV at the far end. In a further embodiment the MP and OC are each able to manage multiple, potentially coordinating, but not overlapping Umbilical and Debris lines, and multiple SROVs. In yet a further embodiment, each OC and MP may also serve as conscious control center for limited-purpose sub-modules (independent modules or assemblies not fully integrated with any existing SROV) for activities such as 'swapping out' one type of actuator or tool for another, replacing a damaged unit, or managing supportive purpose and special-functions such as strain relief or line-repair modules as described herein.

In a further embodiment, a damage-limiting seal closes off a plug (and another for the socket) to avoid internal damage due to separation or penetration of a module or joint. In a further embodiment, the mechanical fasteners that affix the Plug or Socket are self-actuating upon receiving a connection (or disconnection) instruction, and report their status, and any change therein, to the MCU and thus up to the MMCU and the CCU.

In further embodiment, "self-learning" by the Control Units enables continuous improvement for progressive 'adaptation and improvement' of generations of modules without requiring overall SROV re-design and remaking. In a further embodiment incorporates a 'swarm' of sub-SROVs with specialized limited local tasks (scrubber, watcher, debris hauler) on periodic or task-dependent, automatable subordinate operations. In yet a further embodiment, the MP and Operation Center have the capability to operate multiple 'trees' and/or 'nodes' (e.g., promote and enable 'swarm' coordination of multiple SROV units. In a further embodiment, layered, multiple-level, hierarchical yet locally-aware; stacks of cycles depending on connections and SROV configuration. In place of a single device, the system can become 'swarm' and be reconfigured on the fly.

In a further embodiment, a damaged module can be 'dropped' and replaced on-site; potentially the damaged module could then auto-return to the MP for repair. To this end, seals on connectors prevent environmental hazards from affecting modules on separation. This also allows repair after accidental disconnects, and reconnects so that a 'stuck module' need not become a problem on its own.

Concluding Remarks

Throughout this written description of the invention, a described instantiations of a single elements (e.g., platform, SROV, component, plug, socket, bus, conductor, module, tool, system, and assembly) is intended to include as a further extension and possibility an instantiation with multiple elements, so that a 'platform and module' can also be read as 'a first and second platform, each with a first and second module'. Moreover, the plurality may differ at different levels from one instantiation to the next yet each still should be understood as a reasonable, merely differentiated extension.

The scope of this invention includes any combination of the elements from the different embodiments disclosed in this specification, and is not limited to the specifics of the preferred embodiment or any of the alternative embodiments mentioned above. Individual user configurations and embodiments of this invention may contain all, or less than all, of the elements disclosed in the specification according to the needs and desires of that user. The claims stated herein should be read as including those elements which are not necessary to the invention yet are in the prior art and may be necessary to the overall function of that particular claim, and should be read as including, to the maximum extent permissible by law, known functional equivalents to the elements disclosed in the specification, even though those functional equivalents are not exhaustively detailed herein.

What is claimed is:

1. A system, comprising:
a first apparatus for inspecting, cleaning, and maintaining a work surface, including:
a set of interchangeable modules including a frame module and at least one of a first shoulder module, a first articulation module, and a first hand module;
a respective module control unit for embedding intelligence being disposed in each of said interchangeable modules; each of said interchangeable modules having a proximal end, a center, and a distal end; each of said module control units being configured to send and receive signals from each of said interchangeable modules;
each of said module control units creating a respective signal identifying at least one of an identity of said interchangeable module, a configuration of said interchangeable module, a status of said interchangeable module, a functional capability of said interchangeable module, a module connection of said interchangeable module, and a module resource requirement of said interchangeable module;
said frame module being terminated at said proximal end by a first universal connector, and terminated at said distal end by a second universal connector;
said frame module having a master module control unit for aggregating and distributing signals among said set of interchangeable modules, said master module control unit being configured to detect and monitor the identity of each of said interchangeable modules, the configuration of each of said interchangeable modules, the status of each of said interchangeable module, the functional capability of each of said interchangeable modules, the module connection of each of said interchangeable modules, and the module resource requirement of each of said interchangeable modules;
said master module control unit being configured to transmit and receive motion and function coordination signals to each of said interchangeable modules; said master module control unit being connected to a bus for conveyance of signals; said frame module further having a power distribution unit and power conduit connected to said power distribution unit for distributing power among said interchangeable modules;
said shoulder module having a first universal connector at said proximal end and a second universal connector at said distal end;
said articulation module having a first universal connector at said proximal end and further having a second universal connector at said distal end, said articulation module being configured to be at least one of extendable, rotatable, articulateable about multiple axes, and to brace another of said plurality of interchangeable modules; and
said hand module having a first universal connector at said proximal end and further having a second universal connector at said distal end;
a second apparatus for inspecting, cleaning, and maintaining a work surface, including:
a set of interchangeable modules including a frame module and at least one of a first shoulder module, a first articulation module, and a first hand module;
a respective module control unit for embedding intelligence being disposed in each of said interchangeable modules;
each of said interchangeable modules having a proximal end, a center, and a distal end; each of said module control units being configured to send and receive signals from each of said interchangeable modules;
each of said module control units creating a respective signal identifying at least one of an identity of said interchangeable module, a configuration of said interchangeable module, a status of said interchangeable module, a functional capability of said interchangeable module, a module connection of said interchangeable module, and a module resource requirement of said interchangeable module;
said frame module being terminated at said proximal end by a first universal connector, and terminated at said distal end by a second universal connector;
said frame module having a master module control unit for aggregating and distributing signals among said set of interchangeable modules, said master module control unit being configured to detect and monitor the identity of each of said interchangeable modules, the configuration of each of said interchangeable modules, the status of each of said interchangeable module, the functional capability of each of said interchangeable modules, the module connection of each of said interchangeable modules, and the module resource requirement of each of said interchangeable modules; said master module control unit being configured to transmit and receive motion and function coordination signals to each of said interchangeable modules;
said master module control unit being connected to a bus for conveyance of signals; said frame module further having a power distribution unit and power conduit connected to said power distribution unit for distributing power among said interchangeable modules;
said shoulder module having a first universal connector at said proximal end and a second universal connector at said distal end;
said articulation module having a first universal connector at said proximal end and further having a second universal connector at said distal end, said articulation module being configured to be at least one of extendable, rotatable, articulateable about multiple axes, and to brace another of said plurality of interchangeable modules; and
said hand module having a first universal connector at said proximal end and further having a second universal connector at said distal end; and
a remote control connected to a master module control unit of said first apparatus and a master module control unit of said second apparatus and including a computer for controlling, monitoring, and coordinating said first apparatus and said second apparatus simultaneously.

2. The system according to claim 1, wherein:
each of said modules includes a respective sensor;
each of said modules includes a respective actuator;
whenever said apparatus is under remote control, said computer of said remote control is configured to register and acquire data from said sensors in each of said apparatus;
said computer of said remote control detects, registers, and controls said actuators in each of said apparatus;
said computer of said remote control develops plans and responses to data about the surface and an environment, said plans including positioning and orientation commands;
said computer of said remote control transmitting signals for navigating the apparatus and respective modules in response to the positioning and orientation commands;

said computer of said remote control includes a detection unit that detects and controls position and orientation of the apparatus and said modules;

said computer of said remote control includes a coordination unit that coordinates and controls said apparatus for debris removal, recovery, and reclamation;

said computer of said remote control designs, stores, retrieves, and executes solution patterns, control templates, and work processes; and said computer of said remote control includes a human-operable interface for design and operation of the apparatus.

3. The system according to claim 2, wherein said human operable interface integrates, into an overlaid output, a combination of sensor data, simulation of apparatus movement, and previously recorded data.

4. The system according to claim 1, wherein:

each of said modules includes a respective sensor;

each of said modules includes an actuator;

whenever said apparatus is under autonomous control, said master module control unit is configured to register and acquire data from said sensors in each of said apparatus;

said master module control unit detects, registers, and controls said actuators in each of said apparatus;

said master module control unit develops plans and responses to data about the surface and the environment, said plans including positioning and orientation commands;

said master module control unit transmits signals for navigating the apparatus and respective modules in response to the positioning and orientation commands;

said master module control unit includes a detection unit that detects and controls position and orientation of the apparatus and said modules;

said master module control unit includes a coordination unit that coordinates and controls said apparatus for debris removal, recovery, and reclamation;

said master module control unit designs, stores, retrieves, and executes solution patterns, control templates, and work processes; and said master module control unit includes a human-operable interface for design and operation of the apparatus.

5. An apparatus for inspecting, cleaning, and maintaining a work surface, comprising:

a set of interchangeable modules including a frame module and at least one of a first shoulder module, a first articulation module, and a first hand module;

a respective module control unit for embedding intelligence being disposed in each of said interchangeable modules;

each of said interchangeable modules having a proximal end, a center, and a distal end;

each of said module control units being configured to send and receive signals from each of said interchangeable modules;

each of said module control units creating a respective signal identifying at least one of an identity of said interchangeable module, a configuration of said interchangeable module, a status of said interchangeable module, a functional capability of said interchangeable module, a module connection of said interchangeable module, and a module resource requirement of said interchangeable module;

said frame module being terminated at said proximal end by a first universal connector, and terminated at said distal end by a second universal connector;

said frame module having a master module control unit for aggregating and distributing signals among said set of interchangeable modules, said master module control unit being configured to detect and monitor the identity of each of said interchangeable modules, the configuration of each of said interchangeable modules, the status of each of said interchangeable module, the functional capability of each of said interchangeable modules, the module connection of each of said interchangeable modules, and the module resource requirement of each of said interchangeable modules; said master module control unit being configured to transmit and receive motion and function coordination signals to each of said interchangeable modules; said master module control unit being connected to a bus for conveyance of signals; said frame module further having a power distribution unit and power conduit connected to said power distribution unit for distributing power among said interchangeable modules;

said shoulder module having a first universal connector at said proximal end and a second universal connector at said distal end;

said articulation module having a first universal connector at said proximal end and further having a second universal connector at said distal end, said articulation module being configured to be at least one of extendable, rotatable, articulateable about multiple axes, and to brace another of said plurality of interchangeable modules; and said hand module having a first universal connector at said proximal end and further having a second universal connector at said distal end, wherein said frame module further comprises:

an on-board processor;

a sensor;

a distribution element;

a navigation element;

a fail-safe element; and an environmentally-protected, frame enclosing said bus, said on-board processor, said sensor, said distribution element, said navigation element, and said fail-safe element;

a proximal multi-axis joint assembly connecting said proximal universal connector to said proximal end of the frame module; and a distal multi-axis joint assembly connecting said distal universal connector to said distal end of said frame module.

6. An apparatus according to claim 5, further comprising a fail-safe unit within said frame module, said fail-safe unit including:

a back-up battery bank for powering emergency procedures when an external power source fails; and on-board memory, a processor, and a program, said program implementing an automated operation of a pre-programmed, situation-specific task matching last signal inputs stored and received before when said umbilical failed to provide power.

7. An apparatus for inspecting, cleaning, and maintaining a work surface, comprising:

a set of interchangeable modules including a frame module and at least one of a first shoulder module, a first articulation module, and a first hand module;

a respective module control unit for embedding intelligence being disposed in each of said interchangeable modules;

each of said interchangeable modules having a proximal end, a center, and a distal end;

each of said module control units being configured to send and receive signals from each of said interchangeable modules;

each of said module control units creating a respective signal identifying at least one of an identity of said interchangeable module, a configuration of said interchangeable module, a status of said interchangeable module, a functional capability of said interchangeable module, a module connection of said interchangeable module, and a module resource requirement of said interchangeable module;

said frame module being terminated at said proximal end by a first universal connector, and terminated at said distal end by a second universal connector;

said frame module having a master module control unit for aggregating and distributing signals among said set of interchangeable modules, said master module control unit being configured to detect and monitor the identity of each of said interchangeable modules, the configuration of each of said interchangeable modules, the status of each of said interchangeable module, the functional capability of each of said interchangeable modules, the module connection of each of said interchangeable modules, and the module resource requirement of each of said interchangeable modules; said master module control unit being configured to transmit and receive motion and function coordination signals to each of said interchangeable modules; said master module control unit being connected to a bus for conveyance of signals; said frame module further having a power distribution unit and power conduit connected to said power distribution unit for distributing power among said interchangeable modules;

said shoulder module having a first universal connector at said proximal end and a second universal connector at said distal end;

said articulation module having a first universal connector at said proximal end and further having a second universal connector at said distal end, said articulation module being configured to be at least one of extendable, rotatable, articulateable about multiple axes, and to brace another of said plurality of interchangeable modules; and said hand module having a first universal connector at said proximal end and further having a second universal connector at said distal end, wherein said shoulder module has a central shaft and further comprises:
  a plurality of internal sensors for positioning said shoulder module;
  a rotary joint assembly mounted around said central shaft and having a plurality of universal connectors;
  an articulation module attached to at least one of said plurality of universal connectors; and
  a bus splitter routing said bus from said central shaft and distributing said bus separately to each of said universal connectors through said rotary joint assembly.

8. An apparatus for inspecting, cleaning, and maintaining a work surface, comprising:

a set of interchangeable modules including a frame module and at least one of a first shoulder module, a first articulation module, and a first hand module;

a respective module control unit for embedding intelligence being disposed in each of said interchangeable modules;

each of said interchangeable modules having a proximal end, a center, and a distal end;

each of said module control units being configured to send and receive signals from each of said interchangeable modules;

each of said module control units creating a respective signal identifying at least one of an identity of said interchangeable module, a configuration of said interchangeable module, a status of said interchangeable module, a functional capability of said interchangeable module, a module connection of said interchangeable module, and a module resource requirement of said interchangeable module;

said frame module being terminated at said proximal end by a first universal connector, and terminated at said distal end by a second universal connector;

said frame module having a master module control unit for aggregating and distributing signals among said set of interchangeable modules, said master module control unit being configured to detect and monitor the identity of each of said interchangeable modules, the configuration of each of said interchangeable modules, the status of each of said interchangeable module, the functional capability of each of said interchangeable modules, the module connection of each of said interchangeable modules, and the module resource requirement of each of said interchangeable modules; said master module control unit being configured to transmit and receive motion and function coordination signals to each of said interchangeable modules; said master module control unit being connected to a bus for conveyance of signals; said frame module further having a power distribution unit and power conduit connected to said power distribution unit for distributing power among said interchangeable modules;

said shoulder module having a first universal connector at said proximal end and a second universal connector at said distal end;

said articulation module having a first universal connector at said proximal end and further having a second universal connector at said distal end, said articulation module being configured to be at least one of extendable, rotatable, articulateable about multiple axes, and to brace another of said plurality of interchangeable modules; and said hand module having a first universal connector at said proximal end and further having a second universal connector at said distal end, wherein said bus further comprises:
  a plurality of power conductors for conveying power from said proximal to said distal end of each of said modules, each of said power conductors being insulated against environment, leakage, interference, and power loss;
  each of said conductors having a standardized orientation and placement on both a proximal and a distal side of each of said universal connectors.

9. The apparatus according to claim 8, wherein at least one of said power conductors further comprises a connector transmitting at least one of hydraulic pressure, mechanical power, pneumatic pressure, and electrical power.

10. An apparatus for inspecting, cleaning, and maintaining a work surface, comprising:

a set of interchangeable modules including a frame module and at least one of a first shoulder module, a first articulation module, and a first hand module;

a respective module control unit for embedding intelligence being disposed in each of said interchangeable modules;

each of said interchangeable modules having a proximal end, a center, and a distal end;

each of said module control units being configured to send and receive signals from each of said interchangeable modules;

each of said module control units creatin a respective signal identifying in at least one of an identity of said interchangeable module, a configuration of said interchangeable module, a status of said interchangeable module, a functional capability of said interchangeable module, a module connection of said interchangeable module, and a module resource requirement of said interchangeable module;

said frame module being terminated at said proximal end by a first universal connector, and terminated at said distal end by a second universal connector;

said frame module having a master module control unit for aggregating and distributing signals among said set of interchangeable modules, said master module control unit being configured to detect and monitor the identity of each of said interchangeable modules, the configuration of each of said interchangeable modules, the status of each of said interchangeable module, the functional capability of each of said interchangeable modules, the module connection of each of said interchangeable modules, and the module resource requirement of each of said interchangeable modules; said master module control unit being configured to transmit and receive motion and function coordination signals to each of said interchangeable modules; said master module control unit being connected to a bus for conveyance of signals; said frame module further having a power distribution unit and power conduit connected to said power distribution unit for distributing power among said interchangeable modules;

said shoulder module having a first universal connector at said proximal end and a second universal connector at said distal end;

said articulation module having a first universal connector at said proximal end and further having a second universal connector at said distal end, said articulation module being configured to be at least one of extendable, rotatable, articulateable about multiple axes, and to brace another of said plurality of interchangeable modules; and said hand module having a first universal connector at said proximal end and further having a second universal connector at said distal end, wherein:

two of said modules each have a universal connector, each of said universal connectors having a respective mating surface, and said two modules being directly connected by said mating surface of each of said universal connectors;

wherein said bus terminates in each of said universal connectors;

a standardized placement mates ends of said bus when said universal connectors are connected and provides continuity of said bus across said two modules;

a shielding layer surrounds said bus; and an outer surface surrounds said shielding layer, said outer surface being configured for mechanical interaction with an interior rotational and orientation positioner.

11. An apparatus for inspecting, cleaning, and maintaining a work surface, comprising:

a set of interchangeable modules including a frame module and at least one of a first shoulder module, a first articulation module, and a first hand module;

a respective module control unit for embedding intelligence being disposed in each of said interchangeable modules;

each of said interchangeable modules having a proximal end, a center, and a distal end;

each of said module control units being configured to send and receive signals from each of said interchangeable modules;

each of said module control units creating a respective signal identifying at least one of an identity of said interchangeable module, a configuration of said interchangeable module, a status of said interchangeable module, a functional capability of said interchangeable module, a module connection of said interchangeable module, and a module resource requirement of said interchangeable module;

said frame module being terminated at said proximal end by a first universal connector, and terminated at said distal end by a second universal connector;

said frame module having a master module control unit for aggregating and distributing signals among said set of interchangeable modules, said master module control unit being configured to detect and monitor the identity of each of said interchangeable modules, the configuration of each of said interchangeable modules, the status of each of said interchangeable module, the functional capability of each of said interchangeable modules, the module connection of each of said interchangeable modules, and the module resource requirement of each of said interchangeable modules; said master module control unit being configured to transmit and receive motion and function coordination signals to each of said interchangeable modules; said master module control unit being connected to a bus for conveyance of signals; said frame module further having a power distribution unit and power conduit connected to said power distribution unit for distributing power among said interchangeable modules;

said shoulder module having a first universal connector at said proximal end and a second universal connector at said distal end;

said articulation module having a first universal connector at said proximal end and further having a second universal connector at said distal end, said articulation module being configured to be at least one of extendable rotatable articulateable about multiple axes, and to brace another of said plurality of interchangeable modules; and said hand module having a first universal connector at said proximal end and further having a second universal connector at said distal end, further comprising a tool having a universal connector for connecting to another universal connector, said tool being selected from the group consisting of a propulsion tool for propelling said apparatus, a debris removal tool for removing material from the work surface, a debris recovery tool for recovering debris from the work surface, and an inspection tool for sensing an environment surrounding the apparatus, wherein:

a first of said universal connectors of said frame module is connected directly to a first of said universal connectors of said shoulder module;

a second of said universal connectors of said shoulder module is connected directly to a first of said universal connectors of said articulation module;

a second of said universal connectors of said articulation module is connected directly to a first of said universal connectors of said hand module; and said universal connector of said tool being connected directly to said second universal connector of said articulation module.

* * * * *